United States Patent
Wascat et al.

(10) Patent No.: US 11,941,521 B2
(45) Date of Patent: Mar. 26, 2024

(54) VIBRATING MACHINE AUTOMATED DIAGNOSIS WITH SUPERVISED LEARNING

(71) Applicant: ACOEM France, Limonest (FR)

(72) Inventors: Bertrand Wascat, Limonest (FR); Philippe Poizat, Limonest (FR); Jean Michel Becu, Limonest (FR)

(73) Assignee: ACOEM France, Limonest (FR)

( * ) Notice: Subject to any disclaimer, the term of this patent is extended or adjusted under 35 U.S.C. 154(b) by 867 days.

(21) Appl. No.: 17/017,912

(22) Filed: Sep. 11, 2020

(65) Prior Publication Data
US 2022/0083851 A1    Mar. 17, 2022

(51) Int. Cl.
*G06N 3/08*      (2023.01)
*G05B 23/02*     (2006.01)
*G06N 3/047*     (2023.01)

(52) U.S. Cl.
CPC .......... *G06N 3/08* (2013.01); *G05B 23/0221* (2013.01); *G05B 23/0272* (2013.01); *G05B 23/0283* (2013.01); *G06N 3/047* (2023.01)

(58) Field of Classification Search
None
See application file for complete search history.

(56) References Cited

U.S. PATENT DOCUMENTS

| | | |
|---|---|---|
| 4,768,380 A | 9/1988 | Vermeiren et al. |
| 5,566,092 A | 10/1996 | Wang |
| 5,679,900 A | 10/1997 | Smulders |
| 5,633,811 A | 12/1997 | Canada et al. |
| 5,845,230 A | 12/1998 | Lamberson |
| 5,852,351 A | 12/1998 | Canada et al. |
| 5,854,553 A | 12/1998 | Barclay et al. |
| 5,854,994 A | 12/1998 | Canada et al. |
| 5,870,699 A | 2/1999 | Canada et al. |
| 5,875,420 A | 2/1999 | Piety et al. |
| 5,907,491 A | 5/1999 | Canada et al. |

(Continued)

FOREIGN PATENT DOCUMENTS

| | | |
|---|---|---|
| CN | 205138636 U | 4/2016 |
| JP | 3073912 B2 | 8/2000 |

OTHER PUBLICATIONS

Translation of JP 3073912B2 (as received from US PTO).

(Continued)

*Primary Examiner* — Sean Shechtman
(74) *Attorney, Agent, or Firm* — Jordan and Koda, PLLC; Steven P. Koda

(57) ABSTRACT

Supervised learning is implemented to improve the accuracy of automated diagnoses performed by monitoring units installed at a machine. The monitoring units perform indicator acquisition and automated diagnoses based on a Bayesian model derived in accordance with the machine's known configuration. Raw data is collected, including machine vibration data and other diagnostic data. The data is analyzed to diagnose for specific fault defect assumptions so as to generate the automated diagnoses results and a rating for overall health of the machine. The results are uploaded to an external environment that can be accessed by an expert for review and correction. Based upon the expert's corrections, the Bayesian model is adjusted using supervised learning to improve the automated diagnoses performed by the monitoring units.

4 Claims, 19 Drawing Sheets

(56) References Cited

U.S. PATENT DOCUMENTS

| | | |
|---|---|---|
| 5,922,963 A | 7/1999 | Piety et al. |
| 5,943,634 A | 8/1999 | Piety et al. |
| 5,992,237 A | 11/1999 | McCarthy et al. |
| 6,006,164 A | 12/1999 | McCarthy et al. |
| 6,053,047 A | 4/2000 | Dister |
| 6,078,874 A | 6/2000 | Piety et al. |
| 6,124,692 A | 9/2000 | Canada et al. |
| 6,138,078 A | 10/2000 | Canada et al. |
| 6,192,325 B1 | 2/2001 | Piety et al. |
| 6,199,422 B1 | 3/2001 | Boerhout et al. |
| 6,202,491 B1 | 3/2001 | McCarthy et al. |
| 6,275,781 B1 | 6/2001 | Maness et al. |
| 6,301,514 B1 | 10/2001 | Canada et al. |
| 6,351,713 B1 | 2/2002 | Board |
| 6,437,692 B1 | 8/2002 | Petite et al. |
| 6,489,884 B1 | 12/2002 | Lamberson et al. |
| 6,513,386 B2 | 2/2003 | Barclay |
| 6,633,822 B2 | 10/2003 | Maness et al. |
| 6,789,025 B2 | 9/2004 | Boerhout |
| 6,792,360 B2 | 9/2004 | Smulders et al. |
| 7,103,511 B2 | 9/2006 | Petite |
| 7,142,990 B2 | 11/2006 | Bouse et al. |
| 7,313,484 B2 | 12/2007 | Lindberg et al. |
| 7,324,919 B2 | 1/2008 | Lindberg et al. |
| 7,458,269 B2 | 12/2008 | Loesl et al. |
| 7,697,492 B2 | 4/2010 | Petite |
| 7,711,519 B2 | 5/2010 | Lindberg et al. |
| 7,805,281 B2 | 9/2010 | Leigh |
| 8,174,402 B2 | 5/2012 | Bouse et al. |
| 8,223,121 B2 | 7/2012 | Shaw |
| 8,370,109 B2 | 2/2013 | Van Dyke et al. |
| 9,913,006 B1 | 3/2018 | Wascat et al. |
| 9,921,136 B2 | 3/2018 | Wascat et al. |
| 10,533,920 B2 | 1/2020 | Wascat et al. |
| 10,551,243 B2 | 2/2020 | Wascat et al. |
| 2003/0040878 A1 | 2/2003 | Rasmussen |
| 2003/0045976 A1 | 3/2003 | Bechhoefer |
| 2003/0172738 A1 | 9/2003 | Poizat |
| 2003/0177829 A1 | 9/2003 | Kicher |
| 2005/0043922 A1 | 2/2005 | Weidl |
| 2006/0017821 A1 | 1/2006 | Garvey |
| 2008/0068559 A1 | 3/2008 | Howell |
| 2008/0201104 A1 | 8/2008 | Poncet |
| 2009/0150323 A1 | 6/2009 | Hively |
| 2010/0074157 A1 | 3/2010 | Doh |
| 2011/0290024 A1 | 12/2011 | Lefler |
| 2013/0080811 A1 | 3/2013 | Low |
| 2013/0321006 A1 | 12/2013 | Weingaertner |
| 2014/0024392 A1 | 1/2014 | Su |
| 2014/0045537 A1 | 2/2014 | Luther |
| 2014/0069951 A1 | 3/2014 | Schmidt |
| 2014/0121996 A1 | 5/2014 | Piety et al. |
| 2014/0152426 A1 | 6/2014 | Murphy |
| 2014/0222378 A1 | 8/2014 | Piety |
| 2014/0299416 A1 | 10/2014 | Jakes |
| 2015/0219530 A1 | 8/2015 | Li |
| 2016/0016445 A1 | 1/2016 | Peine |
| 2016/0054773 A1 | 2/2016 | Gulati |
| 2016/0054788 A1 | 2/2016 | Gulati |
| 2017/0115739 A1 | 4/2017 | Wei |
| 2020/0380387 A1* | 12/2020 | Pourmohammad ...... G06N 5/04 |
| 2021/0241912 A1* | 8/2021 | Chazin ............... G08B 21/0446 |

OTHER PUBLICATIONS

Translation of Guo Lei et al. (CN 205138636 U) (Year 2016).
Czarnecki, Wojciech Marian; "Weighted Tanimoto Extreme Learning Machine with Case Study in Drug Discovery;" IEEE Computational Intelligence Magazine (revised Dec. 27, 2012); pp. 1-11.
Zhang, Sheng et al.; "Asset Health Reliability Estimation Based on Condition Data;" 2007 Proceedings World Congress on Engineering Asset Management; pp. 1-10.

* cited by examiner

FIG. 3  On-Site Environment 10

FIG. 7 Off-Site Environment 30

FIG. 13

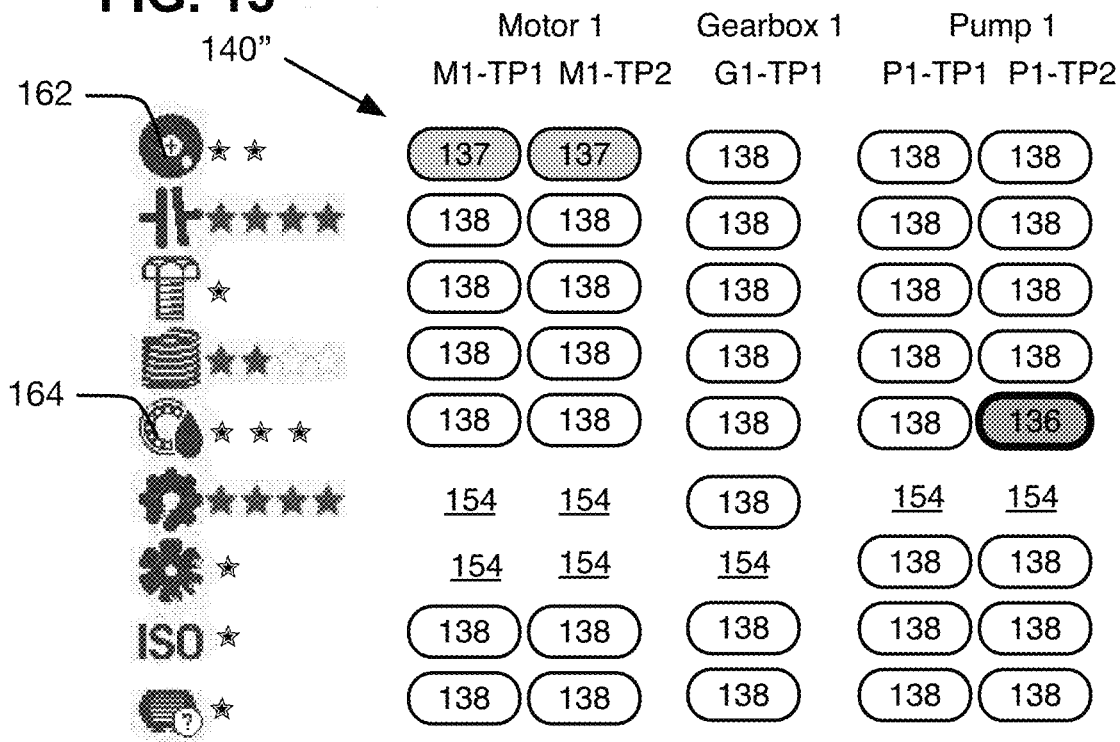

Advice: 136 Critical
Diagnosis: Bearing defect: wear / lubrication + unbalance

Fair overall state for motor 1
Good overall state for gearbox 1
Overall state not acceptable for pump 1.
Bearing defect: wear / lubrication to be corrected. Confidence = ★★★
Unbalance to be watched. Confidence = ★★

Recommendation:

- Bearing wear to be corrected: lubricate the component and measure again. If lubrication is not the cause, then replace the bearing on component pump 1 as soon as possible.
    Location P1-TP1 (Pump 1 test point 1) to be corrected.
- Unbalance to be monitored. Consider correcting during a planned shutdown.
    Location M1-TP1 (Motor 1 test point 1) to be watched.
    Location M1-TP2 (Motor 1 test point 2) to be watched.

FIG. 14

VIBRATING MACHINE AUTOMATED DIAGNOSIS WITH SUPERVISED LEARNING

BACKGROUND OF THE INVENTION

This invention relates generally to the collection and analysis of machine diagnostic data, such as vibration data, temperature, and rotation speed. More particularly, this invention relates to methods and apparatus for implementing artificial intelligence to a model of a machine for ongoing improvement of the automated diagnosis of the machine.

Many types of machines are used in a production or manufacturing facility, such as in the production of consumer and industrial goods and in the delivery of basic utility services. Because of the importance of these machines in meeting production and service requirements, taking a machine offline unexpectedly due to a failure can be costly. Accordingly, it is desirable to implement an effective predictive maintenance program to keep the machines in good working condition. Of concern is that a machine part that is moving or being moved against may result in decreased machine performance and reliability. Eventually if a deteriorating condition is not detected a failure may occur. Examples of such machines for which it is desirable to collect data for preventive maintenance are motors, pumps, generators, compressors, lathes and other machines having rotating or other moving parts, such as a shaft, rotor, or bearings.

Most predictive maintenance programs include the periodic collection of machine diagnostic data, such as vibration data, rotation speed, and temperature. Vibration data is sensed using an accelerometer. Rotation is sensed by a tachometer. Temperature is sensed with a temperature sensor. Analysis of collected data to diagnose a machine typically has required special expertise. As an industrial trend, however, there are fewer technicians able to analyze machine diagnostic data for predicting faults and for identifying a need to perform machine maintenance so as to avoid unexpected failures of rotating machines. Automated diagnosis by computer processes is desired to reduce the need for specially trained technicians. Automated diagnosis typically is based on programmed rules, and as a result may result in false positive results and false negative results.

Accordingly, there is a need for improving the automated diagnosis results to be more accurate and reliable. These and other needs are addressed by various embodiments of the present invention.

SUMMARY OF THE INVENTION

According to the invention, supervised learning is provided for a machine diagnostic system to improve the accuracy and reliability of automated diagnosis results. The machine diagnostic system monitors the diagnostic performance of one or more machines, and includes performing data acquisition and machine diagnosis at the overall machine level (level 1) and at a test point level (level 2). Each machine has one or more monitoring units (e.g., wireless monitoring units; wired monitoring units) installed at one or more test points of the machine in accordance with the machine's configuration. Raw data is collected, including machine vibration data and other machine diagnostic data. The data is analyzed on-site at the installed monitoring units to diagnose for specific conditions (each condition is also referred to herein as a fault defect assumption.) The monitored conditions are selected in accordance with the machine topology. A rating of the overall health condition of the machine also is determined, such as from a select subset of conditions to be monitored. The results of the automated on-site analysis are uploaded to a machine diagnostic database in an external environment (e.g., cloud server, private network, computer) that can be accessed by a user (e.g., a machine maintenance management system; an expert; an authorized login) to review the automated findings.

In preferred embodiments an automated diagnoses module implements a Bayesian probability model to diagnose the fault defect assumptions of a machine. The Bayesian probability model is configured based on the topology of the machine. In one embodiment the Bayesian probability model includes a plurality of naive Bayesian probability sub-networks, in which there is a sub-network for each fault defect assumption of the machine. In another embodiment the Bayesian probability model includes a naive Bayesian probability network and a family neural network. For some fault defect assumptions, the fault defect assumption is diagnosed by a corresponding naive Bayesian probability sub-network of the naive Bayesian probability network. Other fault defect assumptions are grouped into families of fault defect assumptions. There is a naive Bayesian probability sub-network and a family neural sub-network for each family. A probability value is derived for the family using the corresponding naive Bayesian probability sub-network. Each fault defect assumption within the family then is discerned by the corresponding family neural sub-network, so as to diagnose the respective fault defect assumptions within the family, along with the respective confidence level for each of the assumptions.

In particular for some fault defect assumptions, the corresponding Bayesian probability sub-network is effective to determine a probability of the fault being present at the machine. Accordingly, there is a sub-network for each one of such fault defect assumptions. However, some faults have similar symptoms making it difficult for the Bayesian probability sub-network to distinguish among the family of such fault defect assumptions. These fault defect assumptions are grouped together as a family of fault defect assumptions. There is a Bayesian probability sub-network for each such family. For each given family of fault defect assumptions, first the family is diagnosed as a group, then a specific fault defect assumption among the family is resolved.

Each Bayesian probability sub-network includes indicators (e.g., scalars derived from diagnostic data) as inputs, and includes a set of parameters, including symptom apriori and indicator thresholds. Each family neural sub-network also includes a set of parameters, including symptom weights and indicator thresholds. Indicators (e.g., diagnostic data signals; scalars derived from diagnostic data) for the fault defect assumption(s) that is being processed by a given sub-network are input to the given Bayesian probability sub-network. Then based on the corresponding set of parameters, a probability of the fault defect assumption (or fault defect assumption family) being present is determined, so as to derive a fault severity value for the fault defect assumption or a family fault defect probability for the family. Of significance is that for a given fault defect assumption to be tested/monitored/analyzed, there are some symptoms that are more probative than other symptoms. Accordingly, a higher apriori value is given to one symptom over another symptom with regard to diagnosis of the corresponding fault defect assumption. With regard to the indicators, a threshold value is prescribed to determine whether the indicator corresponds to a symptom that is present.

For each family neural sub-network Indicators corresponding to the fault defect assumptions of the family are input to the given family neural sub-network. Then based on the family neural sub-network's set of parameters, the family neural sub-network discerns which fault defect assumption(s) in the family is the most likely to be present. The inputs to the family neural sub-network are the family fault defect probability output from the corresponding Bayesian probability model sub-network and the indicators for the symptoms of the fault defect assumptions that make up the family. The family neural sub-network parameters include the indicator thresholds and symptom weights. The family neural sub-network outputs a fault severity probability value and confidence level for each fault defect assumption within the corresponding family.

Accordingly, the Bayesian probability model as implemented provides probabilities of faults being present for monitored conditions at respective test points of the machine based on the indicator data, (i.e., for fault defect assumptions at specific test points of the machine based on corresponding indicator data). This corresponds to one level of analysis (i.e., level 2). In some embodiments, a confidence level also is determined for each automated diagnoses finding.

A higher level of analysis (i.e., level 1—the overall health condition of the machine) also is determined. The level 1 diagnosis finding is derived from the status (i.e., level 2 diagnosis results) for a select subset of fault defect assumptions. In some embodiment the overall health rating is implemented for a primary component, (e.g., motor; pump) in addition to or instead of for the machine as a whole. In a preferred embodiment the overall health rating is determined based at least on a select set of symptoms determined during a setup process, in accordance with the known topology of the machine. Such level 1 analyses are performed by the monitoring unit, which uploads the results to the machine diagnostic database.

According to an aspect of the invention, a user reviews the indicator data, the test point level automated diagnoses results, and the overall health rating. An indicator table displays the indicator data in a visually informative manner, such as by organizing the data into indicator families. For an indicator that is a chart of data or a waveform, the user can access the chart or waveform by clicking on the cell. For a derived scalar value, the indicator value is displayed in the cell and the cell background is color coded according to a rating of the indicator, (e.g., alarm, warning, okay.) Such format enables a technician to easily find and review data and indicator results of interest.

According to another aspect of the invention, a diagnostic health matrix is displayed to the user, which provides results of the automated diagnosis (and confidence levels of the findings) in a visually informative manner. The matrix is organized by condition and location. In a specific embodiment, each row corresponds to a fault defect assumption for the machine as configured. Each column corresponds to a test point location. Accordingly, each cell of the matrix corresponds to the automated diagnoses results for a given fault defect assumption at a given test point, as applicable. When not applicable, the cell is blank. Of significance is that each cell provides a color-coded label indicative of the presence and severity of the corresponding fault defect assumption at the corresponding test point. In a specific embodiment, a red label corresponds to a critical condition for which urgent action is presently needed to correct a problem. A yellow label corresponds to a condition to be watched. In particular a defect is present and scheduling an action is recommended, but that no urgency is required. A green label corresponds to an okay condition indicating normal findings (i.e., absence of the fault defect being analyzed.) A light green label corresponds to a condition for which a slight defect is present, but no changes or actions are needed. An alternative coding scheme may be provided in other embodiments.

According to another aspect of the invention, the diagnostic health matrix is editable as a separate display construct (so that the original and edited versions of the matrix can be compared or otherwise examined.) A technician clicks on a cell of the diagnostic health matrix to select (and thereby edit) the condition severity in accordance with a prescribed, standardized set of severity ratings. For example, consider a situation in which the technician reviews the indicator table and the diagnostic health matrix and interprets the indicator results differently than the automated diagnoses module. Accordingly the technician disagrees with a specific finding for a fault defect assumption. As an example, the technician changes a red coding to a yellow coding in the diagnostic health matrix so as to change the severity from a condition in need of correction to a condition to be watched, or vice versa, or from a yellow coding to a green coding, of from a green coding to a yellow coding. The technician uses their expertise to select the appropriate severity setting based upon their experience and their expert review of the indicator data.

According to another aspect of the invention, supervised learning is implemented to improve the Bayesian probability model when a user overrides the automated diagnoses findings. The changes made by a user to the results presented in a diagnostic health matrix of a specific machine are used to modify the parameter values of the Bayesian probability model. The user changes may be collected from a review of a single snapshot of results for a given time or from the review of multiple snapshots of results over a period of time. It is desirable that the Bayesian probability model, as updated, provide automated diagnoses results that better correlate to the expert's modified findings. In particular, one or more symptom apriori, symptom weights, and/or one or more indicator threshold values are modified in any one or more Bayesian probability sub-networks and family neural sub-networks. For example, one or more symptom apriori and/or one or more indicator threshold values are changed for the Bayesian probability sub-network portion of the Bayesian probability model that is used for generating the findings stored in the cell that was overridden by the user, (i.e. the findings at a corresponding test point for a corresponding fault defect assumption.) Alternatively or in addition, one or more symptom weights and/or one or more indicator threshold values are changed for the family neural sub-network of the Bayesian probability model that is used for generating the findings stored in the cell that was overridden by the user. The changes are determined so that the updated Bayesian probability model achieves the expert's finding for the corresponding condition when the automated diagnosis is performed in the future using the same or similar (i.e., not significantly changed) indicator data. Further, in some embodiments the changes to the symptom apriori symptom weights, and/or indicator(s) threshold(s) also are implemented in a global data base (e.g., indicators database, symptoms database) from which Bayesian probability models are derived for other same or different machines and other machine configurations. For example the symptom apriori for a global symptom for the fault defect assumption at a similar test point location is updated in the global database to be used in constructing a Bayesian model for other machines. Thus, when a Bayesian probability sub-network and family neural sub-network are configured for another machine that includes the same fault defect assumption at the similar type of test point location, the revised global rule for that fault defect assumption is used to build the Bayesian probability sub-network and the family neural sub-network for that other machine.

The Bayesian probability model implements a Bayesian inference algorithm based on associations of measured indicators and knowledge of vibration analysis on rotating assets (symptoms estimated on indicators, failures estimated on symptoms) parameterized by scalar values. These values are thresholds on indicators (in accordance with applicable standards or based on experience) and apriori (evidence of symptom appearance for each symptoms, evidence of failure appearance knowing the component type, evidence on failure appearance on direction measure, ...) Other information like rotation speed and power of a component also are used to make the diagnosis more accurate considering different component's status. The implementation of a Bayesian probability model in this manner is fundamentally different from pure "big data" number crunching. Instead of collecting and transferring all raw data and all possible information available, the focus is on indicator data known to be relevant as based on experience and expertise, thereby limiting the need for data transfer of all raw data. This is particularly important in the context of wireless communications and self powered systems, because the methodology limits the calculation power needed. Accordingly, the supervised machine learning is directed only to relevant parameters used in the Bayesian probability model of the automated diagnoses modules 66, 70 of the monitoring units 18 of a machine 12.

According to another aspect of the invention, the overall health rating is displayed and editable by an authorized user; and a supervised learning methodology is implemented to train the automated process for generating the overall health rating. Upon reviewing the indicator table and the diagnostic health matrix, the user may disagree with the automatically generated overall health rating of the machine (or primary component, as per the embodiment). A technician, for example, will click on the overall health rating to select (and thereby edit) the health rating in accordance with a prescribed, standardized set of overall health ratings. The technician uses their expertise to select the appropriate rating based upon their experience and their expert review of the indicator data. In a preferred embodiment, the automated finding of the overall health is determined using a classification model (referred to herein as a classification-based neural network.) The classification-based neural network initially is based on a select set of symptoms and other information about the machine (or component). The parameters of the classification-based neural network include probability weights for the symptoms and probability weights for the other respective information. The symptoms, the set of additional information, and the corresponding weights are set during a machine diagnostic setup process for the machine. To train the neural network, a supervised learning process is executed after changes to the automatically generated overall health rating are entered and approved. According to an aspect of the invention, the classification-based neural network is expanded to further include input nodes for each overridden automated diagnoses finding of the diagnostic health matrix and the corresponding confidence level. Such input nodes are referred to herein as classifiers. In a specific embodiment the classification-based neural network parameters (e.g., probability weights) are trained using an iterative process to update the neural network so as to generate an overall health rating consistent with the user's overall health rating determination.

According to another aspect of the invention, a third form of artificial intelligence is implemented to improve the automated diagnoses processes of a machine diagnostic maintenance system. It is desirable to avoid repeating the same faulty diagnosis over the short term when the collected machine diagnostic data has not changed significantly. Accordingly, the monitoring unit compares the indicator results to a prior set of results to determine whether to use the previous diagnoses or to instead perform new automated diagnoses. This prior set of indicator results is referred to herein as a reference set of indicator results. As discussed above, a technician will review the indicator table and diagnostic health matrix. Upon doing so, the technician either confirms the automated diagnoses findings or makes changes to the diagnostic findings. Once the technician's review is approved, the indicator results from the indicator table are sent to the monitoring unit. These indicator results are used by the monitoring unit as the reference set of indicator results. These indicator results are a reference against which new indicator results are compared. The monitoring unit collects new raw data, then derives indicator values from the raw data. Each indicator value is compared to a corresponding indicator in the reference set. The difference contributes to a global variation for the indicator results of the machine. If the global variation for the machine exceeds a prescribed threshold, then the reference set of indicators is out of date. If the global variation for the machine does not exceed the prescribed threshold, then the reference set of indicators remains valid, and the prior diagnoses are maintained, (i.e., the results in the diagnostic health matrix as confirmed or changed by the technician remain as the current diagnoses of the machine conditions.) Accordingly, new automated diagnoses results need not be derived at the monitoring unit when the reference set is found to be valid. However, when the global variation of the indicators for the machine exceeds the prescribed threshold, new automated diagnoses results are derived at the monitoring unit and uploaded to the machine diagnostic database (along with the indicator results.) In due course another set of indicator results and automated diagnoses results are reviewed and confirmed or changed, and result in a new reference set of indicator results that are sent to the monitoring unit.

In an alternative embodiment, when a user makes a change to the diagnostic health matrix, and the change is approved, a notification is sent to the corresponding monitoring unit(s). The notification includes the reference set of indicator results, the fault defect assumption (e.g., condition x) for any automated diagnoses result that was changed, the corresponding test point, and the corresponding fault severity finding of the user (which overrode the automated diagnoses finding). In some embodiments, the corresponding confidence level also is included in the notification. The monitoring unit for the test point identified in the notification processes the notification. Thereafter, when the monitoring unit performs data acquisition and automated diagnoses, the newly-determined automated diagnoses results for the condition x specified in the notification are compared to the condition x results included within the notification. If the results are the same, then the automated diagnoses results are acceptable and are included among the results uploaded to the machine diagnostic database as part of the current time stamped set of results. If the results differ, then the underlying indicator data is compared to the reference set of indicator results. If the indicator data has not changed significantly, then the condition x results specified in the notification are used as the findings for condition x (thereby overriding the results determined from the not yet updated Bayesian probability model for condition x) However, if the current applicable indicator data has changed significantly relative to the flagged indicator data, then the notification is out of date (because the diagnostic conditions have changed.) Accordingly, the notification is cancelled and the automated diagnoses results derived by the Bayesian probability model are used for condition x. In a preferred embodiment, there is another contingency where the notification is cancelled. When the monitoring unit receives an update to the Bayesian model for condition X, the notification concerning condition x is cancelled.

In some embodiments not every set of indicator results and automated diagnoses results are reviewed. For example, in some embodiments results are reviewed periodically or aperiodically, or in response to an automated alert or a manual command. Accordingly, there may be a significant time period where the reference set of indicator results has become out of date. In some embodiments, when the reference set of indicator results is determined to be out of date, the new indicator results computed at the monitoring unit (that are used in the newly executed automated diagnoses) serve as a new reference set of indicator results against which future indicator values are compared. Such new reference set remains the reference until it too is determined to be out of date—or until the monitoring unit receives a download of a new reference set of indicator results.

An advantage of the invention is that the artificial intelligence embodied by the Bayesian probability models of a machine being diagnosed undergoes a learning process to improve the automated diagnoses of the machine diagnostic data.

The inventions will be better understood by reference to the following detailed description taken in conjunction with the accompanying drawings.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 13 is a diagram of a diagnostic health matrix for another given machine configuration showing a set of automated diagnoses results, including confidence rating, according to an embodiment of the invention;

FIG. 14 is a diagram of a narrative report display corresponding to the matrix of FIG. 13 and available for display to a user, according to an embodiment of the invention;

DETAILED DESCRIPTION OF ILLUSTRATIVE EMBODIMENTS

In the following description, for purposes of explanation and not limitation, specific details may be set forth, such as particular devices, components, techniques, protocols, interfaces, hardware, etc. in order to provide a thorough understanding of the present invention. However, it will be apparent to one skilled in the art that the present invention may be practiced in other embodiments that depart from these specific details. Detailed descriptions of well-known computers, terminals, devices, phones, components, techniques, protocols, interfaces, and hardware are omitted so as not to obscure the description of the present invention. Accordingly, computer components and other components, protocols, and interfaces, known to one of ordinary skill in the art of machine vibration data collection and analysis are intended to be inferred into the detailed description. The terms fault and defect are used interchangeably herein, and are not intended to have a different meaning.

Machine Diagnostic Data Acquisition Network Environment

Figure 1:
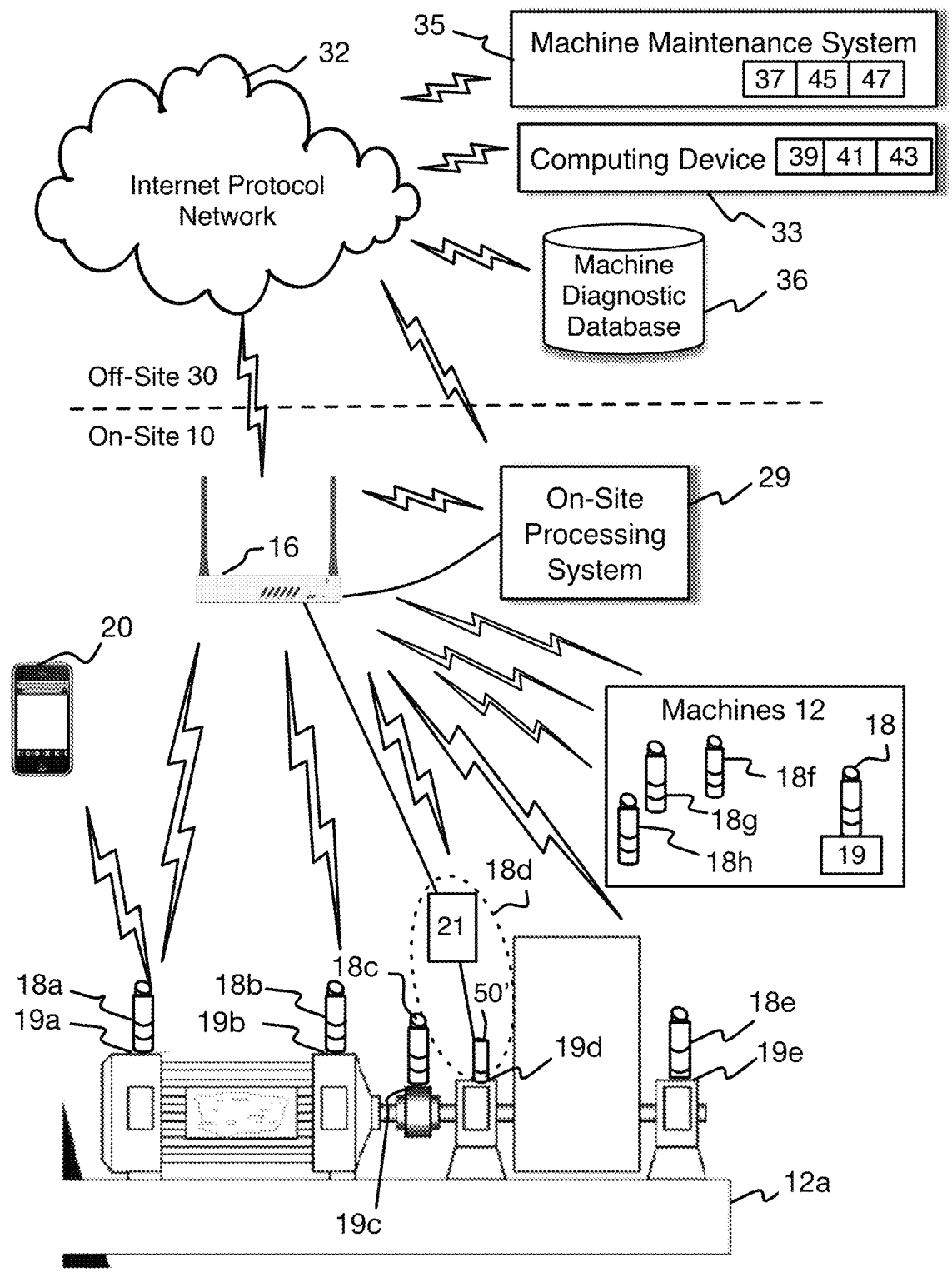
FIG. 1 is a diagram of an exemplary machine diagnostic data acquisition network environment that utilizes one or more monitoring units according to an embodiment of this invention.

FIG. 1 shows a machine diagnostic data acquisition network environment according to an embodiment of this invention. The environment includes an on-site portion 10 and an off-site portion 30. On-site refers to a facility having one or more machines 12 that are monitored in accordance with this invention. A gateway 16 may be provided on-site or near the facility to provide a communication path to off-site operations. All or a subset of the machines of a facility may be monitored in accordance with the invention. The specific number of machines 12 that are monitored may vary. Depicted is a machine 12a among the machines 12. One or more monitoring units 18 are installed at a machine 12 for monitoring any one or more of the machine's vibration, temperature, pressure, or other diagnostic measure as sampled at the location of the monitoring unit 18. The sample location is referred to as a test point 19. As depicted, machine 12a has five monitoring units 18a, 18b, 18c, 18d, 18e installed at five respective test points 19a, 19b, 19c, 19d, 19e. Other monitoring units 18f, 18g, 18h are installed at other machines 12. The specific number of machines 12, monitoring units 18, and test points 19 may vary. In an exemplary embodiment a monitoring unit 18 may communicate wirelessly with the gateway 16, a local device 20, or an on-site processing system 29. Alternatively a monitoring unit (e.g., monitoring unit 18d) may communicate through a wired connection with the gateway 16, a local device 20, or an on-site processing system 29.

The gateway 16 provides a communication link to the off-site portion 30, such as via a public or private internet protocol network 32. A central or distributed machine diagnostic database 36 is located off-site. A permitted user may access the machine diagnostic database 36 by executing a machine diagnostic/maintenance application from a computing device 33 having a processor 39, display 41, and memory 43. A machine maintenance system 35 having a processor 37, display 45, and memory 47 also may access the machine diagnostic database 36. Further, an on-site processing system 29 or local device 20 having a processor, display, and memory, and appropriate software installed also can access the machine diagnostic database 36. The local device 20 and/or on-site processing system 29 may link to the off-site portion 30 via the local gateway 16 or in some embodiments by any other entry point to the internet protocol network 32. An example of a local device 20 is a smart phone, ipad, tablet computer, or other mobile computer device. An example of an on-site processing system 29 is a personal computer, embedded computer, or a mobile computer device.

Each machine 12 hosting a monitoring unit 18 has part(s) that move or are moved against, such as a shaft, rotor, bearings, and gears. For example, machine 12a may include a motor, a pump, a generator, a compressor, and/or a lathe. To keep the machines in good working condition and monitor for decreased performance or reliability over time, automatic diagnosis processes are performed. In particular, fault defect assumptions (e.g., faults, alarm conditions, or other defect or impending-defect conditions) are identified so as to schedule a maintenance operation as appropriate. The benefits are immediate as the predictive maintenance scheduling avoids production losses and reduces maintenance costs (e.g., spare part management is more efficient; maintenance can focus on the defective component only; collateral damage to other components of the machine can be avoided).

The machine diagnostic data acquisition network environment 10/30 provides a solution for monitoring machine assets of a company. In particular data may be collected on-site and transmitted off-site for analysis. Alternatively, the data may be evaluated on-site by the monitoring unit 18 and the local device 20 or the on-site processing system 29. In a preferred embodiment, automatic diagnosis processes are performed by the monitoring units 18a, 18b, 18c, 18d, 18e mounted at respective test points 19a, 19b, 19c, 19d, 19e on the host machine 12a. For some monitored conditions (referred to herein as fault defect assumptions), the condition may be of a type that a complete automatic diagnosis may be achieved based solely on the diagnostic data obtained from a given monitoring unit 18a at a given test point 19a of the host machine 12a. For other monitored conditions, diagnosis performed by an individual monitoring unit 18a may be incomplete. This is because for such other conditions, data from other test points 19b, 19c, 19d, 19e may be required or preferred to make an accurate diagnosis of the condition of the host machine 12a. Diagnosis of an overall health rating of a machine 12 preferably is based on data from multiple test points 19 of the machine 12. Accordingly, in some embodiments the multiple monitoring units 18a, 18b, 18c, 18d, 18e communicate with each other to consolidate analysis of the respective test points 19a, 19b, 19c, 19d, 19e to diagnose the health of the machine 12a as a whole, (i.e., at the machine level of analysis.) In an example embodiment, one monitoring unit 18 is configured to receive analysis results from the other monitoring units 18 installed on the same machine 12 to assess the overall health of the machine 12.

Monitoring Unit Embodiments

Figure 2:
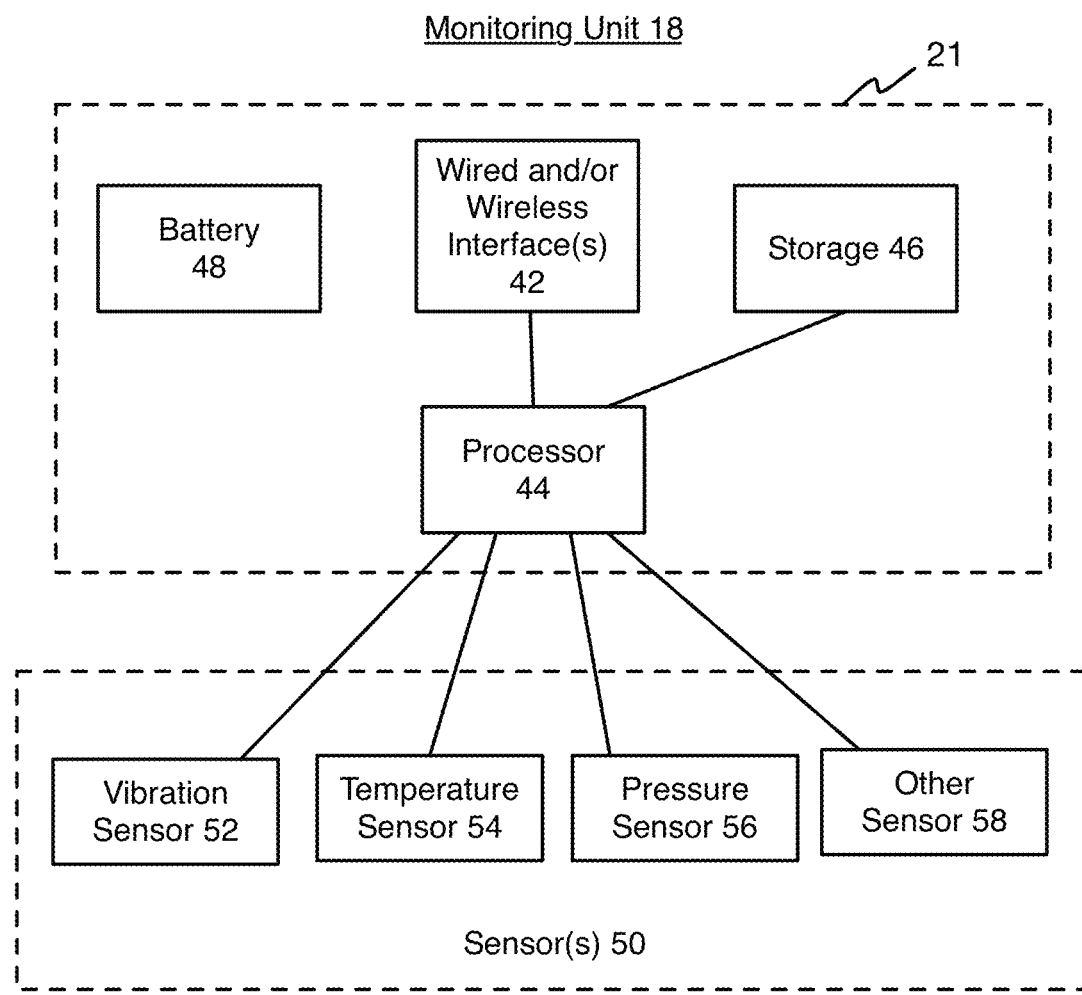
FIG. 2 is a block diagram of an exemplary vibration sensing monitoring unit implemented in accordance with an embodiment of this invention.

FIG. 2 shows a block diagram of a monitoring unit 18. A monitoring unit 18 includes a housing, a communication interface, an on/off switch, a sensor, a battery, and a circuit board with one or more circuit components mounted thereon. In a preferred embodiment each monitoring unit 18 is permanently installed at a test location 19 on a machine 12. By permanent, it is meant that the monitoring unit 18 is to remain installed over a prolonged time period (of months) and will not be dislodged during normal machine operating conditions. It is expected that the battery 48 of the monitoring unit 18 will be replaced periodically, or as needed. In some embodiments the monitoring unit 18 is mounted to the machine 12 with a magnet. In other embodiments, a fixture is used, such as a threaded post and correspondingly threaded receptacle. Accordingly, the monitoring unit 18 also includes a mounting structure (such as a magnet, threaded opening, or threaded post) that serves to facilitate mounting of the monitoring unit 18 to the machine 12.

The monitoring unit 18 includes one or more communication interfaces 42 (e.g., near field wireless; wi-fi wireless; radio frequency wireless; wired interface), a processor 44, storage 46, a battery 48, and one or more sensors 50, such as a vibration sensor 52, a temperature sensor 54, a pressure sensor 56, or another sensor 58 (e.g., velocity sensor, stroboscope, absolute displacement sensor, relative displacement sensor, electrical current sensor, audio transducer.) In some embodiments, the communication interface is a wireless interface. In other embodiments the communication interface is a wired interface. In still other embodiments, both a wired and a wireless interface are included. For example, in some embodiments the monitoring unit may include both wireless communication interface(s) and one or more wired interfaces, such as to connect by wire to a separately packaged sensor 50' (see FIG. 1), the local device 20, the on-site processing system 29, or the gateway 16 (or an intervening router or network device.)

In a preferred embodiment the vibration sensor 52 is an accelerometer that senses the machine's vibration in x, y, and z axes, (e.g., one accelerometer unit measuring in each of the 3 axes; three accelerometers in which each one of the three measure in a respective one axis of the x, y, and z axes.) It offers comparatively high performance, in the sense that it has technical specification ratings that meet the metrological requirements for vibration measurements used to perform condition monitoring and diagnosis of the host machine. In an example embodiment the sensor 52 provides 3-axis synchronous acquisition with a 50+kS/s rate on each axis (i.e., x, y, and z axes), a 3 dB frequency bandwidth of 10 to 20 kHz on each axis, a signal to noise ratio of 85 to 115 dB; and exhibits an accuracy of +/−5% at 160 Hz. In a specific embodiment full-scale accelerometer detection is rated at 50 g. The bandwidth, signal to noise ratio, accuracy and other performance specifications may vary in other embodiments.

The processor 44 executes software made up of computer programs, databases, and other data constructs. The processor 44 is configured to activate and control the sensors 50 for taking samples of data. In preferred embodiments the processor 44 also is configured with condition-monitoring software for analyzing collected machine data, and with other software for performing automatic analysis of machine diagnostic data.

The storage 46 preferably is random access memory, flash memory, or nonvolatile memory having a capacity to store a most recent set of raw data collected by the sensors 50 for a test point assessment, along with the results derived therefrom (i.e., derived indicator values, automatic diagnosis results). It is preferred that the storage 46 has the capacity to manage a communication failure during communications with the gateway 16 without a loss of information. In other preferred embodiments, storage 46 has the capacity to store such data plus the derived indicator values for a prescribed rolling window of time (or rolling window of data sets). Storage of the indicators for a rolling window allows evolution of the indicators to be reviewed to assess whether there is a trend. (e.g., for a full assessment performed once per day, in a specific embodiment the prescribed window is 30 days so that a set indicators is stored for each of the most recent 30 days.) In other embodiments, only the most recent raw data, indicator results, and automatic diagnosis results for a single full assessment are stored along with a trend of each indicator. The trend is stored rather than the rolling window of indicators from which the trend is derived. The trend is updated with each full assessment or at a prescribed time interval, (e.g., once per day). One type of indicator is a signal derived from collected raw data. Another type of indicator is a scalar value derived from collected raw data. The set of indicators includes both signals and scalar values.

The monitoring unit 18 communicates with the gateway 16 (or another access point; or an interim device, such as a router) through the communication interface 42. In a specific embodiment the communication interface 42 implements a wireless radio frequency communication protocol, (e.g., ISA100.11a; wireless HART; SP100.11a (open standard); ZigBee™; 6LoWPAN (internet task force); a proprietary protocol such as a CyNet™ mesh network from Cyan Technology; a low power wide area network (LPWAN) such as by SIGFOX™; LoRa™; NEUL™; any 3G, 4G, or 5G, protocol; any of the 802.11 family of standards; or a similar standard.) In other embodiments, a near field communication protocol is maintained—instead or in addition to the protocols listed above.

In a preferred embodiment a battery 48 of sufficient capacity to provide a battery life of 1 year or more is used. In a most preferred embodiment a D-cell battery of 17 Ah is used, which may provide a battery life as long as 5 years under select conditions. The capacity of the battery 48 may vary.

Various—and more detailed—hardware and software configurations of an exemplary monitoring unit 18 (and a wired version of the same) are described in the following commonly-assigned: U.S. Pat. No. 9,921,136 of Wascat et al. issued Mar. 30, 2018 for "WIRELESS COLLECTION AND ANALYSIS OF MACHINE DATA;" U.S. Pat. No. 10,533,920 of Wascat et al. issued on Jan. 14, 2020 for "AUTOMATIC ROTATING-MACHINE FAULT DIAGNOSIS WITH CONFIDENCE LEVEL INDICATION;" U.S. Pat. No. 9,913,006 of Wascat et al. issued on Mar. 6, 2018 for "POWER-EFFICIENT DATA-LOAD-EFFICIENT METHOD OF WIRELESSLY MONITORING ROTATING MACHINES:" and U.S. patent Ser. No. 10/551, 243 of Wascat et al. issued on Feb. 4, 2020 for "POWER EFFICIENT MACHINE DIAGNOSTIC MONITORING USING MULTIPLE VIBRATION SENSOR WIRELESS CONFIGURATION."

The term monitoring unit as used herein refers to embodiments of a wireless monitoring unit, embodiments of a wired monitoring unit performing the same functions, and embodiments of a monitoring unit having both a wired interface and a wireless interface. Further, the term monitoring unit includes embodiments in which one or more sensors 50', which sample raw data, are packaged as separate standalone parts from a unit 21 (see FIGS. 1 and 2) including the processor and memory at which automated diagnosis is performed.

Figure 3:
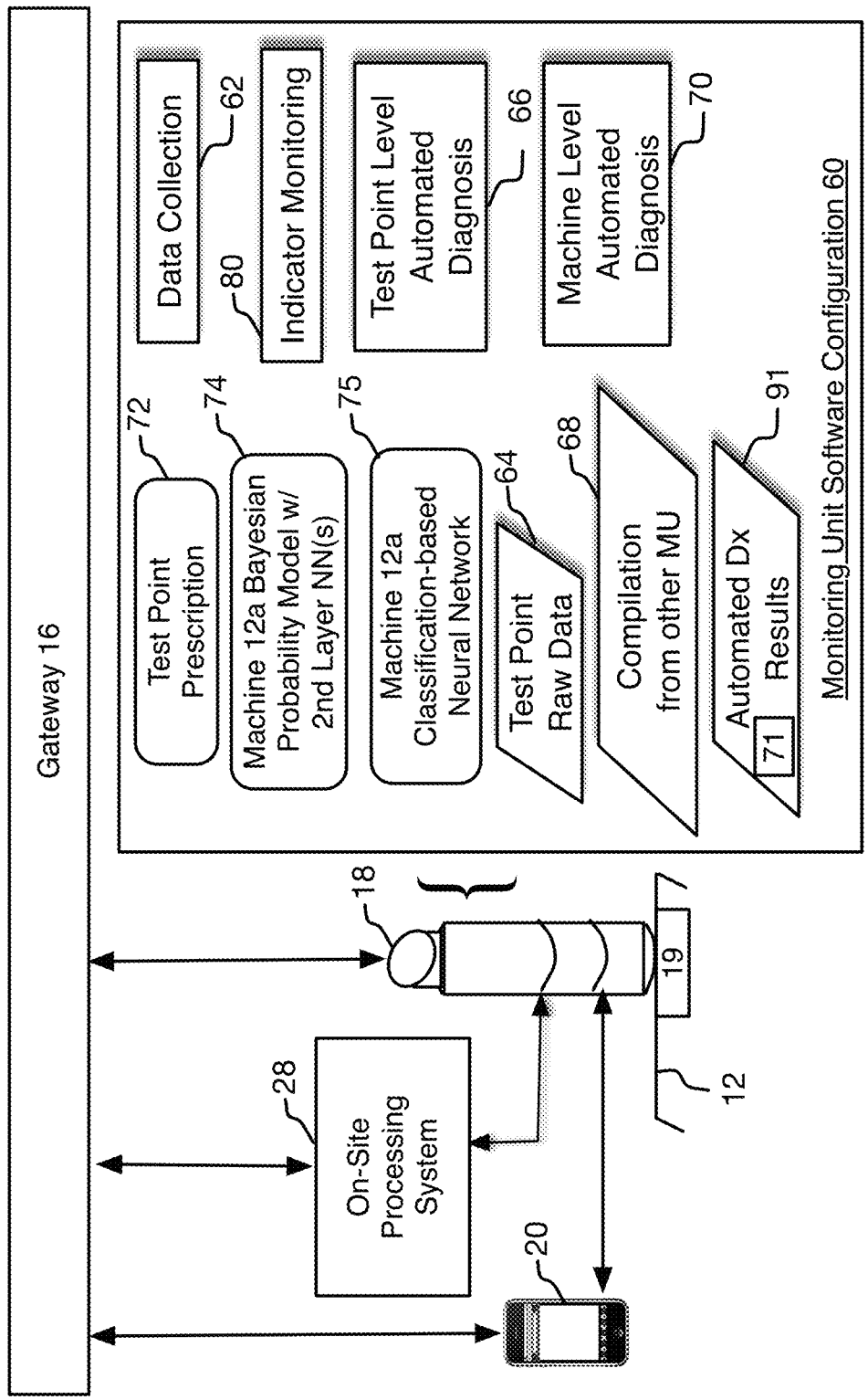
FIG. 3 is a diagram of the on-site portion of the machine diagnostic data acquisition network environment of FIG. 1, according to an embodiment of this invention.

On-Site Environment, Monitoring Unit Software Configuration, and Data Collection FIG. 3 shows on-site portion 10 of the machine diagnostic data acquisition network environment of FIG. 1, including the monitoring unit 18 software configuration 60 in accordance with an embodiment of this invention. Each monitoring unit 18 includes a data collection module 62 configured to collect test point raw data 64 at the test point 19 associated with the monitoring unit 18. Each monitoring unit 18 also includes an indicator monitoring module 80 and an automated diagnosis module 66 configured to derive indicator values and perform automated diagnosis based on the data 64 collected from the associated test point 19. For example, some of the vibration data is processed/grouped to derive an indicator in the form of a signal. Also, some of the collected data is processed to derive an indicator in the form of a scalar value.

For at least one monitoring unit 18 (at a machine 12 that has multiple monitoring units 18 installed) data collection also encompasses compiling data 68 (e.g., raw data, indicator results, automated diagnosis results) received from at least one other monitoring unit 18 installed at the same machine 12. Such at least one monitoring unit 18 also includes an automated diagnosis module 70 configured to perform condition monitoring and automated diagnosis based on the compiled data, so as to diagnose fault defect assumptions requiring analysis of data from multiple test points 19 and to diagnose the overall health of the machine 12.

The specific data 64 collected by data collection module 62 will depend on the particular test point 19 in the context of the specific machine configuration/topology. A test point prescription 72 for the test point 19 is received or derived and stored in the monitoring unit 18 based on the specific machine configuration. The test point prescription 72 includes test point parameters, test point measurement/collection instructions, and identification of indicators to be derived, conditions (i.e., fault defect assumptions) to be monitored, and fault diagnoses to be performed. In a preferred embodiment the test point prescription includes: an automatic definition of the indicators to be monitored; an automatic definition of fault defect assumptions, characteristic symptoms, and symptom weights; and an automatic association of alarm thresholds on standard indicators as defined by the ISO10816-3 standard with symptoms.

In some embodiments the test point prescription 72 is derived locally at the monitoring unit 18 during execution of a machine setup module (not depicted) that identifies the machine's topology (e.g., the presence and relative location of a shaft, bearings, gearbox, and/or pump; the type of coupling between each component; the rotation speed and power output for the machine.) Although other types of information also may be stored as part of the machine configuration, the basic information indicated above is sufficient to determine the test point prescription 72. In other embodiments a setup process (not executed by the monitoring unit 18) is executed which defines the machine's topology. For example, the machine configuration may be determined at the local device 20, on-site processing system 29, another monitoring unit 18, or as part of off-site processing, (e.g., setup process 102—see FIG. 7). The specific test point prescription 72 for the specific monitoring unit 18 at the specific test point 19 then is loaded into the specific monitoring unit 18.

Exemplary raw data 64 collected in accordance with the test point prescription 72 includes vibration data, temperature data, pressure data, and/or other machine data. In an example embodiment a vibration sensor 52 embodied by tri-axial accelerometer provides 3-axis synchronous acquisition with a 20 kHz bandwidth on each axis (i.e., x, y, and z axes) within a 3 db frequency range (e.g., 15 kHz (z-axis) 6 kHz (x-axis and y-axis) and an 80 dB signal to noise ratio; and exhibits an accuracy of +/−3%. In a specific embodiment full-scale accelerometer detection is rated at 80 g. The bandwidth, signal to noise ratio, accuracy and other performance specifications may vary in other embodiments.

A pyrometer performs contactless temperature measurement or a temperature sensor 54 may directly sense temperature. In an example pyrometer embodiment temperature is sensed with a one second time response and 95% emissivity within a range of 0° C. to 200° C. to an accuracy of +/−3° C. for ambient temperature, and with a resolution of 0.5° C. in a field of view of 5° at 50% (e.g., 4 cm target at 50 cm distance).

A stroboscope senses rotation speed of a machine part within a range of 30-15000 revolutions per minute (rpm) and a flash duration of 0.5 to 15°. An audio transducer detects machine sound that is then recorded and stored as part of the raw data 64.

Indicator Monitoring and Automated Diagnosis at Monitoring Unit 18

Figure 4:
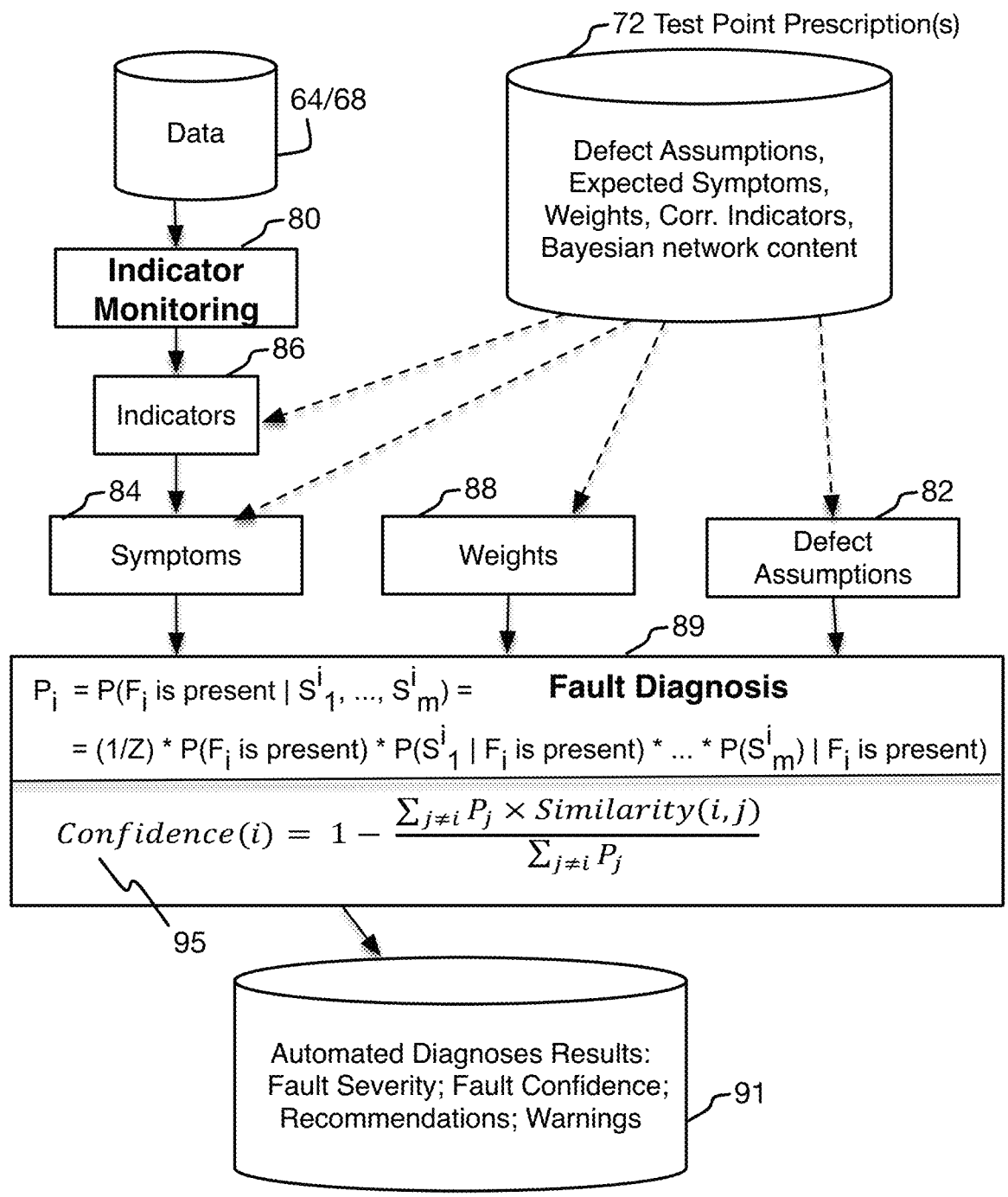
FIG. 4 is a data and control flow diagram of automated diagnosis performed by a monitoring unit.

FIG. 3 shows that the monitoring unit 18 software configuration 60 includes indicator monitoring 80, test point level 2 automated diagnosis 66, and machine level 1 automated diagnosis 70. FIG. 4 shows a detailed data and control flow diagram of the indicator monitoring module 80 and automated diagnoses modules 66/70. The flow is the same for both modules 66/70, and preferably is the same software, which is being executed with a different scope of data. The specific indicator monitoring and diagnostic determinations by these modules 66, 70 are identified in the test point prescription 72 based upon the specific machine configuration. Indicator monitoring 80 is performed on the raw data 64 and compiled data 68 to derive values for associated indicators 86. The test point level automated diagnoses module 66 determines fault severity values and confidence level values for fault defect assumptions defined in accordance with the test point prescriptions. The machine level automated diagnoses module 70 determines fault severity values and confidence level values for fault defect assumptions derived from indicators from multiple test points, and further includes a process for determining the overall health rating 71 of the machine 12.

Based on the machine configuration (and as specified in the test point prescription), a set of fault defect assumptions 82 (i.e., conditions to be monitored) are provided for a given test point 19 of machine 12. The fault defect assumptions 82 determine the indicator monitoring 80 that is performed. The presence or lack of presence of components corresponds to the presence or lack of specific fault defect assumptions. For example, a machine having a pump will have a fault defect assumption for a cavitation fault; a machine having a gearbox will have a fault defect assumption for a gear defect.

Fault diagnosis 89 is performed on machine diagnostic data, and in preferred embodiments from at least vibration data sensed from a rotating machine. When a fault is detected a severity and confidence level are provided for such fault. The severity is based on a Bayesian probability calculated for the fault. A confidence level is based on a similarity between characteristic symptoms to be diagnosed for the fault and characteristic symptoms to be diagnosed for other faults of the machine.

For each fault defect assumption among the set of fault defect assumptions 82 identified for a given machine, there is a set of predetermined characteristic symptoms 84. Each characteristic symptom for a given fault defect assumption is screened to determine a probability of whether the symptom is present. For each symptom there is a corresponding indicator 86 or set of one or more indicators 86. The indicators 86 are resolved for the corresponding fault to achieve resolved indicator values. The indicator value(s) are tested against criteria to determine a probability for the symptom. There also are apriori 88 associated with each symptom 84 for a given fault (i.e., defect assumption 82). Such apriori 88 is determined according to a naive Bayesian probability model. The same symptom may have a different apriori in connection with the diagnosis of a different type of fault of the same machine, according to the naive Bayesian probability model for such other fault. The symptom probability and symptom apriori are used to compute a fault severity probability for the fault being present, which is interpreted to provide an indication of fault severity. When the computed probability of the fault is less than a threshold value (e.g., 50%) the fault is not diagnosed as present in the machine.

In an example embodiment the faults screened for are mass unbalance; misalignment; mounting defect; looseness; structural resonance; lubrication defect; rolling element bearings defects (Pitting, general wear); gear defects (tooth wear, broken tooth, backlash); and cavitation. These are common faults that can be detected based on algorithms. The process of fault diagnosis 89 based on common faults has resulted in good reliability for the diagnoses and recommendations automatically generated. The addition of other, less common faults in some instances may lower the reliability of the confidence level analysis 95 of the fault diagnosis 89. Accordingly, configuring the automated diagnoses 66, 70 for common faults is preferable.

In a specific embodiment the test point prescriptions 72 for a machine includes a number, name, location, and direction of measurement for each test point location on the machine from which data is to be collected. Such locations are determined based on either of two options: (i) for tri-axial measurements, 3 test points are generated—one for measuring each of an X- Y- and Z-axis component of the measurement; or (ii) for a minimal measurement, a test point is identified for each one of either a single axis or two axes in radial and axial directions only.

The specific diagnostic determinations by the automated diagnoses modules 66, 70 (e.g., condition monitoring 80, fault diagnosis 89, confidence level determination 95) are identified in the test point prescription 72 based upon the specific machine configuration. In a preferred embodiment the automated diagnoses modules 66, 70 use a Bayesian probability model 74 to perform the diagnoses of fault defect assumptions.

Bayesian Probability Model

In a preferred embodiment, a Bayesian probability model 74 (see FIG. 3) is implemented by the automated diagnose modules 66/70 to determine the severity diagnosis for a fault defect assumption 82. In some embodiments the Bayesian probability model is provided as a plurality of naive Bayesian probability sub-networks in which each sub-network processes a corresponding fault defect assumption to derive a fault severity probability and fault severity rating. In a preferred embodiment embodiments the Bayesian probability model is provided as a plurality of naive Bayesian probability sub-networks and one or more family neural sub-networks. Each naive Bayesian probability sub-networks processes either a single corresponding fault defect assumption or a family of fault defect assumptions. For each naive Bayesian probability sub-network that processes a family of fault defect assumptions there is a corresponding family neural sub-network. The naive Bayesian probability sub-network for the family processes the indicators for the corresponding fault defect assumption of the family to derive a family fault severity probability. The family neural sub-network further processes the indicators and processes the family fault severity probability to determine which zero or more fault defect assumptions are present. The family neural sub-network outputs a fault severity probability and fault severity rating for each fault defect assumption of the corresponding family.

A naive Bayesian probability model is a simple case of a Bayesian probability model in which each root node (i.e., each fault defect assumption node and each fault defect assumption family node) is independent of the other root nodes (i.e., other fault defect assumption nodes and fault defect assumption family nodes). Accordingly, there is a Bayesian probability sub-network for each fault defect assumption and family of fault defect assumptions. In one embodiment each family neural sub-network also is a simple case of a Bayesian probability model in which each root node (i.e., the family fault severity finding and each fault defect assumption within the family are independent of the other root nodes. In other embodiments, the family neural sub-network need not be a simple case of a naive Bayesian probability model, but instead may be based on further data. For embodiments of the simple case of the naive Bayesian probability model the computed Bayesian probability for severity of a given fault defect assumption is based only on the characteristic symptoms for such fault defect assumption, and not on the diagnosis of any other fault defect assumption. Each fault defect assumption node includes a set of attribute nodes, (i.e., one attribute node per characteristic symptom). Basing the severity probability on the naive Bayesian structure corresponds to assuming that the characteristic symptoms are independent given the presence (or absence) of the fault.

For each fault defect assumption 82 the assumption is processed individually or as part of a family of fault defect assumptions. In particular for some fault defect assumptions, the Bayesian inference algorithm is effective to determine a probability of the fault being present at the machine. Accordingly, there is a first layer Bayesian probability sub-network for each one of such fault defect assumptions. However, some faults have similar symptoms making it difficult for the Bayesian inference algorithm to distinguish within a given family of faults. These fault defect assumptions are grouped together as a family of fault defect assumptions. There is a first layer Bayesian probability sub-network for each such family. There also is a second layer family neural sub-network for each family. For a family of fault defect assumptions, first the family is diagnosed as a group by the first layer Bayesian probability sub-network (implementing the Bayesian inference algorithm.) Then a specific fault defect assumption among the family is resolved by the second layer family neural sub-network for the family.

There is a fault definition used to configure a corresponding first layer Bayesian probability sub-network of the naive Bayesian probability model 74 for each fault defect assumption for each family of fault defect assumptions. A fault defect assumption 82 is processed either by itself or as part of a family. If processed as part of a family, the specific fault defect is resolved at the second layer of processing (i.e., the second layer family neural sub-network.) For each fault defect assumption and each family of fault defect assumptions the fault definition includes the set of characteristic symptoms for the fault defect assumption (or the family of fault defect assumptions), the corresponding indicator(s) for each characteristic symptom among the set of characteristic symptoms, and the apriori for each one characteristic symptom of the set of characteristic symptoms. The naive Bayesian probability model for a fault defect assumption includes the known probability of the fault defect assumption (i.e., condition) on this type of machine, the set of characteristic symptoms and their respective apriori, and the indicators that define each characteristic symptom for the fault. The second layer family neural sub-network for a fault defect assumption family includes the known probability of the fault defect assumption (i.e., condition) on this type of machine, the set of characteristic symptoms and their respective symptom weights, and the indicators that define each characteristic symptom for each fault within the family.

One exemplary family is a bearing defect family, which includes two fault defect assumptions: bearing flaking defect and a lubrication problem. Another exemplary family encompasses the following three fault defect assumptions: unbalance, misalignment, and resonance. Still another exemplary family encompasses shocks and modulation conditions: electrical defect, looseness, neighbor disturbance, and Vanne pass. For each of these families the first layer of processing generates a fault defect severity probability that does not discern among the members of the family. That first layer output is input to the corresponding second layer family neural sub-network for the family, which in turn determines a fault severity probability for each of the fault defect assumptions within the family. One of the fault defect assumptions in the family also is identified as being the most likely condition that is present.

The symptoms of a fault defect assumption (processed at layer 1 or layer 2) need not include every possible symptom that would appear when the fault is present, but includes a set of those symptoms that effectively characterize the fault. Each symptom is based on one or more indicators derived from machine diagnostic data. A technician experienced in vibration analysis knows what sensor data and vibration analysis measures are important for diagnosing a fault. Such data and measures are used to define the characteristic symptoms.

There is a fault defect assumption for each condition to be monitored. The relationship between the fault defect assumption and the identification of the fault to be diagnosed is the same for any machine and remains unchanged over time. Accordingly, based solely on the components and the fault defect assumptions 82 as specified in the test point prescriptions 72, a set of potential faults that any machine 12 may experience during its useful life is identified. According to a preferred embodiment, the following types of fault defects provide the range of fault defects that may be included in a set of potential fault defects for a machine: mass Unbalance; misalignment; mounting defect; looseness; structural resonance; lubrication defect; rolling element bearings defects (Pitting, general wear); gear defects (tooth wear, broken tooth, backlash); and cavitation. In other embodiments additional or different types of fault defects are included. However, by limiting the set of potential faults that may be screened automatically to a set of common faults, the overall reliability of the automatic fault diagnosis module for determining machine health, diagnosing faults, and making automatic recommendations is found to be better. Other less common faults present in the machine are identified by other methods, such as by an experienced technician viewing the collected data and automated diagnosis module results 91.

In an example embodiment, the processor 44 is configured to compute the Bayesian probability $P_i \in [0,1]$ ($i=1,N$) for severity of a given fault (or fault family) $F_i$ among N faults/fault families, in which each fault/fault family $F_i$ is defined by the set of 'm' characteristic symptoms $S^i = \{S^i_1, \ldots, S^i_m\}$, given the information about the presence of each symptom, by implementing the following equation (1):

$$P_i = P(F_i \text{ is present} | S^i_1, \ldots, S^i_m) =$$

$$(1/Z) * P(F_i \text{ is present}) * P(S^i_1 | F_i \text{ is present}) * \ldots * P(S^i_m) | F_i \text{ is present})$$

where $$Z = P(F_i \text{ is present}) * P(S^i_1 | F_i \text{ is present}) * \ldots * P(S^i_m) | F_i \text{ is present}) +$$
$$P(F_i \text{ is not present}) * P(S^i_1 | F_i \text{ is not present}) * \ldots * P(S^i_m) | F_i \text{ is not present})$$

and where $$P(S^i_j | F_i \text{ is present}) =$$
$$P(S^i_j) * K^i_j | F_i \text{ is present} + (1 - P(S^i_j)) * (1 - K^i_j | F_i \text{ is present})$$

$$P(S^i_j | F_i \text{ is not present}) =$$
$$P(S^i_j) * K^i_j | F_i \text{ is not present} + (1 - P(S^i_j)) * (1 - K^i_j | F_i \text{ is not present})$$

The values for the probability that $F_i$ is present (i.e., $P(F_i$ is present)) and the probability that $F_i$ is not present (i.e., $P(F_i$ is not present)) are prescribed values for the machine which do not change from machine specimen to machine specimen of the same machine model. The values are prescribed to be a value between 0 and 1 by any experienced machine diagnostic technician based on a history of the machine model and do not change. As implemented, they are constants used by the automatic setup software when configuring the machine setup data module 250 for the machine. $F_i$ is present corresponds to the probability that the fault (or fault family) appears knowing the context (e.g., kind of component), in which the corresponding apriori vary for different components.

The probability value that each given characteristic symptom $S_j$ for fault Fi given that fault $F_i$ is present (i.e., $P(S^i_j | F_i$ is present)), and the probability value that each given characteristic symptom $S_j$ for fault Fi given that fault $F_i$ is not present (i.e., $P(S^i_j | F_i$ is not present)) are computed during the fault diagnosis module 160 execution. As noted by the equation, each such probability value has two components: a probability that the symptom $S_j$ for fault i is present (i.e., $P(S^i_j)$); and an apriori value $K^i_j$ for such symptom j for such fault i (e.g., $K^i_j | F_i$ is present; $K^i_j | F_i$ is not present). The probability that the symptom $S_j$ for fault i is present (i.e., $P(S^i_j)$ is computed during the fault diagnosis module 89 execution. The apriori and symptom weights are prescribed parameters and are not based on the acquired machine diagnostic data. The apriori and symptom weights are set and stored in a machine setup data module by the automatic setup software (e.g., setup process 102). The apriori and symptom weights are read from the machine setup data module during the fault diagnosis 89 execution. Note that there is one apriori or and symptom weight value $K^i_j$ for each such symptom j for such fault i given that fault i is present, and a different apriori or symptom weight value $K^i_j$ for such symptom j for such fault i given that such fault is not present. These apriori and symptom weights are parameters of the first layer Bayesian sub-network and the second layer family neural sub-network. In some embodiments the symptom apriori and the symptom weight are the same. The term symptom apriori is used in connection with the layer one Bayesian sub-network. The term symptom weight is used in connection with the layer two neural sub-network.

A description of the assignment of the apriori (and symptom weight) parameter values is discussed here. Any given characteristic symptom for a given fault is prescribed as being a primary symptom of the fault or a secondary symptom of the fault. One common apriori value is prescribed for each primary symptom of a given fault and another common apriori value is prescribed for each secondary symptom of a given fault. Such common values may vary from one fault type to another fault type, (e.g., the common value for primary symptoms of a mass unbalance fault differ from the common value for a primary symptom of a bearing defect fault; the same logic applies for secondary symptoms). An apriori is a value assigned based on a hypothesis formed on the behavior of the machine (e.g., the symptom behavior as presented in the corresponding indicators and raw data.) More specifically, the apriori is a probability of occurrence a symptom. The initial value (as stored in the symptoms global database 108 is assigned in an empirical manner (knowledge based.) The apriori is updated based on statistical learning, such as from the supervised learning process 106.

For a given fault, the apriori value of each primary symptom $S_j$ for fault Fi given that fault $F_i$ is present is the same. Also, the apriori value of each primary symptom $S_j$ for fault Fi given that fault $F_i$ is not present is the same. However, the apriori value of a primary symptom $S_j$ for fault Fi given that fault $F_i$ is present need not be the same as the apriori value of such primary symptom $S_j$ for fault Fi given that fault $F_i$ is not present. Further, the apriori value of a primary symptom $S_j$ for fault Fi given that fault $F_1$ is present need not be the same as the apriori value of such same primary symptom $S_j$ for fault $F_2$ given that fault $F_2$ is present. Similarly, the apriori value of a primary symptom $S_j$ for fault Fi given that fault $F_1$ is not present need not be the same as the apriori value of such same primary symptom $S_j$ for fault $F_2$ given that fault $F_2$ is not present.

In an example embodiment the machine diagnostic databases 36 include a table of apriori values. There are two entries for each one fault of the set of common faults for which the automated diagnoses module 66/70 is configured, (i.e., a primary symptom apriori and a secondary symptom apriori). Such values are prescribed. Thus, for a configuration of 10 common faults there are 20 entries in the table.

A symptom is prescribed to be a primary symptom or a secondary symptom for a given fault based on the symptom's known importance or significance in contributing to the diagnosis of such fault. Such knowledge is known to an experienced machine diagnostic technician or experienced machine vibration analysis technician. The specific number stored in the table for a primary apriori of a given symptom versus a secondary apriori for a given symptom is configurable as a setup parameter with the embodiment of the automatic setup software (i.e., as compiled) Thus, the two values for a given fault type can be changed (by the manufacturer of the fault diagnosis module) to adjust the effectiveness of the fault diagnosis 89. Accordingly, effective values preferably are determined empirically for each of the common fault types.

A description of the derivation of the probability that a symptom $S_j$ for a fault i is present (i.e., $P(S^i_j)$) is discussed here. The symptom probability $P(S^i_j)$ is not a parameter of the naive Bayesian probability model. It is a computed value, which along with the symptom probabilities for the other characteristic symptoms of a given fault serve as an inputs to the network to obtain a probability $P_i$ for a fault $F_i$.

The diagnosis of a symptom is a determination of a probability that the symptom is present in the machine. The probability determination is modeled by a sigmoid function F(x), where X is an indicator function. X is obtained by resolving a set of one or more indicators that define the given symptom. Consider a simple scalar indicator, H0=amplitude of the first harmonic of the rotation speed. For an example symptom, the symptom is that indicator H0 is high. In conventional fault diagnosis, a simple threshold is compared to the first harmonic of the rotation speed to determine in binary terms whether the symptom is present or not. However, a value just below the threshold may be significant and dismissed using such an approach. According to an exemplary embodiment, such near-miss information is factored into the diagnosis. According to a preferred embodiment, a sigmoid function is applied, so that instead of a binary 1 or 0 as the symptom diagnosis outcome there is a probability value as the diagnosis outcome. For example, $F(X)=1/(1+\exp(-\lambda(X-\mu)))$ is the equation for the sigmoid function according to the preferred embodiment. X is the resolved value of the indicator, (i.e., the computed first harmonic of the rotation speed). $\lambda$ and $\mu$ are parameters used to fit the data to the sigmoid function for this symptom. In effect the parameters define a pair of thresholds for defining a first probability value and second probability value outcome of F(X). The shape of the sigmoid curve is the same for each symptom. The values of $\lambda$ and $\mu$ differ and serve to scale the curve to the specific symptom.

For a symptom defined by a function of multiple indicators, the indicators typically are related. For example, a symptom may relate to a spectrum acceleration as compared to preponderant indicators calculated from the same spectrum, (e.g., a symptom H0 is preponderant is an indication of whether H0 is preponderant over H1 and H2. The function F(X) for such a preponderant indicator is expressed as $F(X)=F(H0=1\times H0, H1=2\times H0, H2=3\times H0)=(1\times H0)/(1\times H0+2\times H0+3\times H0)$, where X is plugged into the sigmoid function to obtain the probability $P(S^i_j)$).

The relating of an indicator to a symptom along with the test criteria for diagnosing the symptom is based on the knowledge used in vibration analysis and other machine diagnostic data analysis. For example, a vibration technician knows that the value of the high frequency acceleration energy band is an indicator for a bearing fault, and knows that there is a threshold to apply to such indicator. Rather than defining the scalar threshold value, the parameters of $\lambda$ and $\mu$ are defined as informed by such threshold value to arrive at symptom diagnosis according to embodiments of the present invention. Similarly a vibration technician knows that H0 preponderant is an indicator for a mass unbalance fault. Rather than defining a simple threshold value for preponderance, the parameters of $\lambda$ and $\mu$ are defined as informed by such simple threshold value to arrive at symptom diagnosis for H0 preponderant according to embodiments of the present invention. Other symptoms based on a single indicator or a set of indicators are defined using the same methodology.

Thus the definition for each symptom includes an indicator(s) and a pair of parameters $\lambda$ and $\mu$ to test the indicator and determine a probability value $P(S^i_j)$ for presence of the symptom. An indicator is a measurement collected with a sensor or the results of automatic diagnosis processing of the raw data collected by a sensor from a test point. An indicator is defined by the measurement or analysis result, the test point for the measurement, and the direction of measurement (e.g., radial, axial, oblique, x-, y-, z-axis). For a given fault, the set of characteristic symptoms may encompass indicators corresponding to data or analysis results of data measured from a common test point location or from varying test point locations. For example, for a given fault one symptom's indicator may relate to a radial measurement taken from one test point location, while another symptom's indicator may relate to an axial measurement taken from a different test point location. As another example, for another given fault one symptom's indicator may relate to an x-axis measurement taken from one test point location, while another symptom's indicator may relate to a y-axis measurement taken from the same test point location using a tri-axial accelerometer. For a fault that has symptoms with indicators requiring measurements from multiple test point locations, the fault diagnosis for such fault is performed automatically after the raw data is collected from all of the specific multiple test point locations contributing data to the fault symptoms' indicators.

Flow Chart of Automated Diagnosis with Confidence Level Indication

Figure 5:
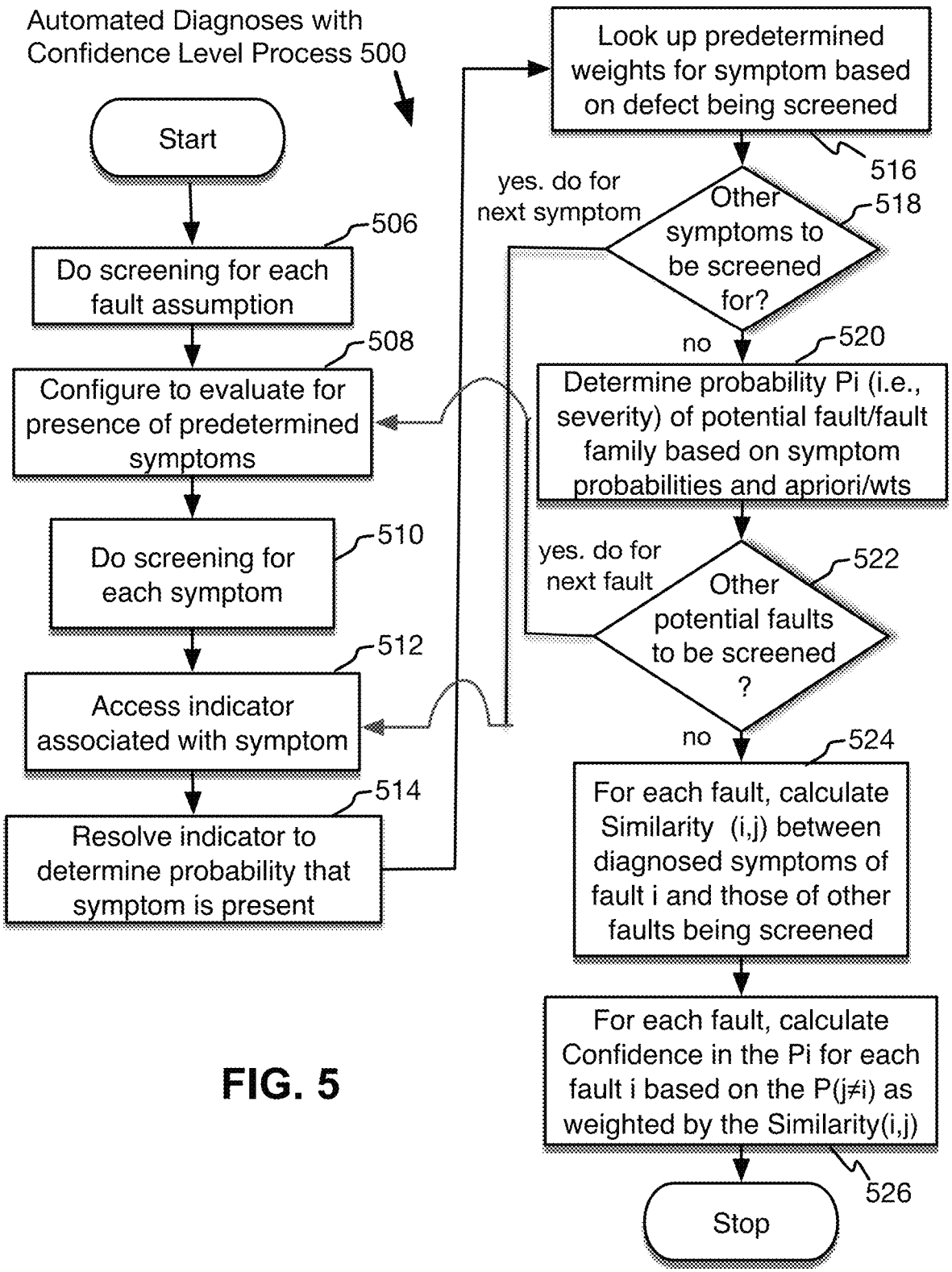
FIG. 5 is a flow chart of an automated diagnoses process with a confidence level determination.

FIG. 5 is a flow chart of an embodiment of the automated diagnoses process 500 (executed as automated diagnoses module 66, 70—see FIG. 3) that includes a confidence level determination 95 (see FIG. 4). At step 506, screening of faults commences for the set of potential faults identified for the current machine 12. Screening occurs for each one fault among the set of potential faults. At step 508, the set of characteristic symptoms 84, stored in the corresponding test point prescription 72 is loaded for the first fault of the set of potential faults to be screened. Each symptom 84 among the set of characteristic symptoms is to be screened to diagnose whether such characteristic symptom is currently present in the machine.

At step 510, screening of characteristic symptoms commences for the set of characteristic symptoms for the first fault among the set of faults. At step 512 the indicator definition for the first symptom of the set of characteristic symptoms is identified from the test point prescription 72. At step 514, the indicator 86 is resolved with specific data according to the indicator definition. The resolved indicator value then is tested against criteria (e.g., an alarm threshold) so as to diagnose the first symptom. Following is a partial set of indicators 86 (i.e., time domain or frequency domain data series processed as to be a signal; computed values) that are monitored by the automatic diagnosis modules 66, 70:

"OVL ACC (g)": RMS Overall Acceleration
"OVL Velocity (mm/s)": RMS Overall Velocity
"ACC HF (g)": Value of the High Frequency Acceleration Energy band (g)
"ACC LF (g)": Value of the Low Frequency Acceleration Energy band (g)
"ACC MF (g)": Value of the Medium Frequency Acceleration Energy band (g)
"DEF": ACOEM Bearing Defect Algorithm, giving indication on the bearing health grade. (Similar to a crest factor)
"Shock": ACOEM Shock Detection Algorithm characterizing the presence of shocks (YES/NO)
"H0 (mm/s)": Amplitude of the First Harmonic of the rotation speed extracted on the velocity spectrum
"H1 (mm/s)": Amplitude of the Second Harmonic of the rotation speed velocity spectrum
"H2 (mm/s)": Amplitude of the Third Harmonic of the rotation speed velocity spectrum
"H0 (dB)": Emergence of the First Harmonic of the rotation speed from the acceleration spectrum floor
"H1 (dB)": Emergence of the Second Harmonic of the rotation speed extracted from the acceleration spectrum floor
"H2 (dB)": Emergence of the Third Harmonic of the rotation speed from the acceleration spectrum
"Ku": Kurtosis Other units of measure may be used for the indicators. The indicators above are provided as illustrative examples and are not meant to be the exclusive set of indicators used for fault diagnosis. In various embodiments additional indicators may be included. In some embodiments the indicators are based solely on current data collected from the machine during the current route. In other embodiments one or more of the indicators may be based on historical data previously collected from the same machine, while the other indicators are based on current data collected from the machine during the current route. In various embodiments the indicators are based on machine vibration data. In other embodiments one or more indicators is based on other machine diagnostic data, (e.g., pyrometer data; stroboscope data; tachometer data). In various embodiments one or more of the illustrative indicators may be omitted. Further, each indicator described above is only part of the indicator definition as applied to a specific symptom. An indicator as applied to a specific symptom is further defined by the test point location and the measurement direction (e.g., axial; radial; oblique; or x-, y-, or z-axis) for the raw data used to resolve the indicator, as appropriate. For example, H0 (mm/s), the amplitude of the First Harmonic of the rotation speed extracted on the velocity spectrum, is calculated for a specific symptom based on data collected from a specific test point. Such test point is defined during the machine setup data module configuration so as to acquire a data measurement from a specific direction. In an example case for one fault definition F(a) with an characteristic symptom K, the associated indicator for the symptom K is defined by the value for H0 (mm/s) as determined from data collected at test point TP1 where a radial measurement is taken. In another example case for a second fault definition F(b) that has an characteristic symptom L, the associated indicator for the symptom L is defined by the value for H0 (mm/s) as determined from data collected at test point TP2 where an axial measurement is taken. As a result the resolved value for the indicators will be different when testing the indicators to diagnose symptom K and symptom L, even though both rely on a determination of H0 (mm/s) in the indicator definition for the symptom. Further, even if a fault definition F(c) has the same characteristic symptom K and thus relies on an indicator also based on a radial measurement, the definition with regard to fault F(c) may specify that the data used is that collected from test point TP2—a different test point. As a result, the calculated value for the indicator will be different in some instances because the data source is from a different test point.

During the following description indicators are referred to by their name (e.g., ACC HF (g)). However, as described above, the indicator is further defined by the test point location and direction of measurement in order to resolve the value for the indicator.

A symptom 84 is defined as a probability value based on a fitting of the resolved indicator to the sigmoid function for such symptom. For example, "Overall ACC HIGH" is a symptom, and "Overall ACC Low" is another symptom. A value for overall ACC is resolved according to the fault definition and a sigmoid function is applied to the resolved value to determine a probability (P(S)) of whether overall ACC is high. The parameters ($\lambda$, $\mu$) for determining the probability of what is a high overall ACC is part of the symptom definition for the characteristic symptom of the potential fault, and are stored in the test point prescription 72.

As an example, for a mass unbalance fault the set of characteristic symptoms 388 includes: indicator OVL Velocity (mm/s) is high; indicator H0 (mm/s) is high; indicator H1

(mm/s) is high; indicator H2 (mm/s) is high; indicator ACC LF (g) is high; indicator Ku is low; indicator shocks is no; and indicator H0 (g) is preponderant, where each indicator is based on data obtained from measurements at a single test point location positioned to obtain radial measurements. Of such 8 symptoms, the indicator OVL Velocity (mm/s) is high, indicator H0 (mm/s) is high, and indicator H0 (g) is preponderant symptoms are primary symptoms and the other symptoms are secondary symptoms. Such set of 8 characteristic symptoms is the same for the mass unbalance fault for every machine. Further, when there are two mass unbalance defects to be tested on a machine (because there are two components triggering the defect assumption), the set of 8 characteristic symptoms is the same—although the test point location will differ (and therefore the resolved indictor values also may differ).

A probability of symptom presence is determined when the resolved value, is tested against prescribed criteria (e.g., an alarm threshold as relaxed by parameters $\lambda$, $\mu$ of the sigmoid function). While all the indicators for the mass unbalance fault are based on measurements from a single test point location and single direction, for other faults, the indicators may involve both radial measurement and axial measurements taken from multiple test point locations; or may involve x-axis, y-axis, and/or z-axis measurement obtained from a tri-axial accelerometer at a single test point location.

As another example, for the bearing defect the set of characteristic symptoms 388 includes: indicator OVL Velocity (mm/s) is high; indictor DEF is high; indicator ACC HF (g) is high; and indicator shocks is yes. The data used to resolve these four indicators is obtained from measurements at a common test point location positioned to obtain radial measurements. Of such 4 symptoms indicator OVL Velocity (mm/s) is high, indictor DEF is high, and indicator ACC HF (g) is high are primary symptoms. Indicator shocks is yes is a secondary symptom. Such set of 4 characteristic symptoms is the same for the bearing defect fault for every machine. In addition the apriori assigned to each one symptom of the bearing defect fault is the same for every machine. The same applies for every fault. Specifically, the set of characteristic symptoms and their apriori, along with the corresponding indicators used to diagnose the symptoms are the same on every machine and for every machine configuration for a given fault. The resolved values for the indictors may differ. In addition, the number of test point locations from which the measurements are to be taken and the directions for such measurements also are the same for each machine and machine configuration for a given fault. In addition, a given machine may have a plurality of the same component. As a result, a machine with two sets of bearings has two "bearing defects" among the set of potential fault defects to be screened for the machine. The test point locations are different for the two, but the characteristic symptoms, the indicators, and the symptoms apriori are the same. In addition, for both faults the measurements performed to collect the data for all four indicators are from one test point location for one of the bearing defects and from another test point location for the other of the bearing defects. Such measurements are from a common direction of measurement (e.g., radial) for both bearing defects at the respective test point locations.

At step 516 the pre-assigned apriori 88 are loaded for the characteristic symptom 84 being screened. Such apriori 88 are determined from the naive Bayesian probability model for the current fault as described above, and are always the same for such symptom in connection with such fault. For example, if the same fault occurs two times among the set of potential faults for a machine, then the symptom has the same respective apriori as applied to each of the two faults. If the same fault occurs among the set of potential faults for two different machines, then the symptom has the same respective apriori as applied to the fault for each machine, regardless of differences in the machine configurations. Further, the Bayesian probability model for a given fault is the same for any machine of a given machine type, and is the same for each occurrence of the fault among the set of potential faults for the given machine.

The apriori assigned to an individual one characteristic symptom among the set of characteristic symptoms associated with a fault vary according to how important the symptom is to the diagnosis of the fault. For example, for the mass unbalance fault, the radial component symptoms indicator's OVL Velocity (mm/s) is high, indicator H0 (mm/s) is high, and indicator H0 (dB) is preponderant are the primary contributing symptoms to the diagnosis of the mass unbalance fault and accordingly are assigned higher apriori values than the other 5 symptoms forming the Bayesian probability model for the bearing defect. As another example, for the bearing defect, the radial component symptoms indicator OVL Velocity (mm/s) is high, indictor DEF is high, and indicator ACC HF (g) is high are the primary contributing symptoms to the diagnosis of the bearing defect and accordingly are assigned higher apriori values than the other symptom forming the Bayesian probability model for the bearing defect.

At step 518 a determination is made as to whether there are other symptoms among the set of characteristic symptoms for the current fault to be screened. If there is another characteristic symptom among the set to be screened, then steps 512-518 are repeated. Iterations of steps 512-518 continue until all of the characteristic symptoms are screened for the current fault.

Once all the characteristic symptoms for the current fault have been screened, then at step 520, the Bayesian probability P(i) for the current fault/fault family i is determined. If F corresponds to a fault family, then the probability P(i) is input to the corresponding layer 2 neural sub-network to discern which fault among the family is the most likely fault defect that is present. The layer 2 neural sub-network outputs a fault severity probability P(i) for each fault defect assumption in the family. The probability for each fault defect assumption (derived at layer 1 or layer 2) is stored among the analysis results 91. The fault severity probability for fault Fi is an indication of severity of the current fault, and is determined by equation (1) above. This is the output of the Bayesian probability model 74 (and if applicable, the second layer family neural sub-network) for the given fault defect assumption 82. When the fault severity probability output from the layer 1 processing for a family is less than a prescribed value (e.g., less than 50%), no fault defect is considered to be present within the family. Accordingly, in some embodiments the layer 2 neural sub-network processing need not be performed for a given family of fault defect assumptions when the layer one probability is less than a prescribed value for such family.

At step 522 a determination is made as to whether there are other faults to be screened among the set of potential faults for the current machine. If there is another fault to be screened, then steps 508-522 are repeated for the next fault. Iterations of steps 508-522 continue until all of the potential faults among the set of potential faults for the current machine are screened. Accordingly, outputs of the Bayesian probability model 74 are derived each given fault defect assumption 82 for each test point 19, as applicable.

At step 524-526 the confidence level for each fault is derived. The derived confidence levels are stored among the analysis results 91. The derivation is based on a plurality of similarity values computed by the processor for each fault with respect to each other fault. For example, for a set of four potential faults being screened for a machine, there are three similarity values calculated for each of the four potential faults. For a first fault, there is one similarity value with respect to each of the other three faults among the set of four, regardless of whether any of such potential faults are diagnosed. Therefore, there are 12 similarity values in total derived for the example of four potential faults of a machine. The similarity value for first fault i with respect to a second fault j is based in part on an intersection of characteristic symptoms for the first fault and the second fault. More specifically it is derived by equation (2), as follows:

$$\text{Similarity}(i, j) = \frac{InterCount(i, j)}{UnionCount(i, j)}$$

$$InterCount(i, j) = \sum_{k \in (S_i \cap S_j)} 1 - |w(i, k) - w(j, k)|$$

and $$UnionCount(i, j) = \|S_i\| + \|S_j\| - InterCount(i, j)$$

and where $w(i,k) \in [0,1]$ is the probability that characteristic symptom k of fault i is present, (i.e., $P(S^i_k)$ as discussed above with regard to the naive Bayesian probability model); and $\|S_i\|$ denotes the number of characteristic symptoms in the set $S_i$ of characteristic symptoms for fault i.

The Intercount is based on the determined probabilities (i.e., $P(S^i_k)$) for the characteristic symptoms that are common to the definitions of faults i and j, (i.e., an intersected set of symptoms). For example, in a case where potential fault $F_i$ has 8 characteristic symptoms; potential fault $F_j$ has 6 characteristic symptoms; $F_i$ and $F_j$ have two characteristic symptoms in common; the apriori of the first common characteristic symptom are 0.2 and 0.3 for the faults i and j, respectively; and the apriori of the second common characteristic symptom are 0.25 and 0.2 for the faults i and j, respectively; then the Intercount (i,j) is 1−[(0.3−0.2)+(0.25−0.2)], which is 0.85. The Unioncount (i,j) in such case is 8+6−0.85=13.15. The Similarity (i,j) for such example is 0.85/13.15=0.065.

The confidence level for fault $F_i$ is computed as the complement to '1' of the sum of all the similarity values of the fault $F_i$ against all the other faults $F_{j \neq i}$; weighted with the probability of occurrence of each other fault $F_{j \neq i}$. Thus, a fault $F_i$ that has high similarity values with the other faults will have a confidence level close to zero, while a fault with low similarity values with the other faults will have a confidence level close to one. The confidence level C(i) for a fault $F_i$ among the set of potential faults for the current machine is derived by the equation (3) as follows:

$$C(i) = 1 - \frac{\sum_{j \neq i} P_j \times \text{Similarity}(i, j)}{\sum_{j \neq i} P_j}$$

The confidence level, C(i) (part number 95 in FIG. 4), is a function of the similarity values derived for fault i and the Bayesian probabilities determined for all the potential faults, except fault i. For example, where the similarity values derived for fault i are 0.065, 0.15, and 0.35 and the Bayesian probabilities for the potential faults other than fault Fi are 0.6, 0.7, 0.8, the confidence level for fault Fi is C(i)=1−{[(0.6*0.065)+(0.7*0.15)+(0.8*0.35)]/[0.6+0.7+0.8]}=1−{[0.039+0.105+0.28]/[2.1]}=1−0.202=0.798. Accordingly, the confidence level for a fault i is based on the probabilities for the other faults; the number of characteristic symptoms in common between fault i and each of the other faults, respectively (i.e., intersection); the apriori for such common symptoms; the total number of characteristic symptoms for fault i; the total number of characteristic symptoms for each of the other potential faults of the machine; and the number of symptoms in the union set of characteristic symptoms for all the potential faults of the machine being screened. A confidence level is derived for each one potential fault among the set of potential faults being screened for the current machine 12.

The fault severity probability for each fault defect assumption is used to determine a qualitative severity assessment for the potential fault. For a potential fault where the fault defect probability is less than 0.51, the potential fault is not diagnosed as being present for the machine 12. Where the probability is 0.51≤Pi<0.65, a first severity level is indicated (e.g., a yellow flag) on a report or display. Where the probability is 0.65≤Pi<0.80, a second severity level is indicated (e.g., an orange flag) on a report or display. Where the probability is ≥0.80, highest severity level is indicated (e.g., a red flag) on a report or display. In various embodiments the number of intervals into which the probability is divided for reporting the severity assessment and the size and boundaries of such intervals vary.

The confidence level for each potential fault is used to determine a confidence indicator for the potential fault. For a potential fault where the confidence level is less than 0.5, the presence of the fault is doubtful, so the potential fault is not diagnosed as being present—regardless of the P(i) value for such potential fault. Accordingly, a potential fault is not diagnosed when either one of the following conditions are met: its Bayesian probability is less than a prescribed value (e.g., 0.51), or its confidence level is less than a prescribed level (e.g., 0.5). When the confidence level for fault i is ≥0.875 (and the probability is ≥0.51), the confidence indicator indicates certainty of the presence/diagnosis of the fault i. When the confidence level for fault i is 0.75≤Ci<0.875, (and the probability is ≥0.51), the confidence indicator indicates a high probability of the presence/diagnosis of the fault i. When the confidence level for fault i is 0.625≤Ci<0.75, (and the probability is ≥0.51), the confidence indicator indicates a good probability of the presence/diagnosis of the fault i. When the confidence level for fault i is 0.5≤Pi<0.625, (and the probability is ≥0.51), the confidence indicator indicates that the presence/diagnosis of the fault i is suspect. In various embodiments the number of intervals into which the derived confidence level is divided for reporting purposed and the size and boundaries of such intervals vary. For diagnosed faults detected as suspect due to the relatively low confidence level, additional warnings are presented to the technician in some embodiments suggesting the technician request a complementary analysis by a technician experienced in vibration analysis to confirm the fault defect before taking any maintenance action.

The fault severity and fault confidence values for the fault defect assumptions 82 are the automated diagnoses results 91.

Overall Health Rating 71

Figure 6:
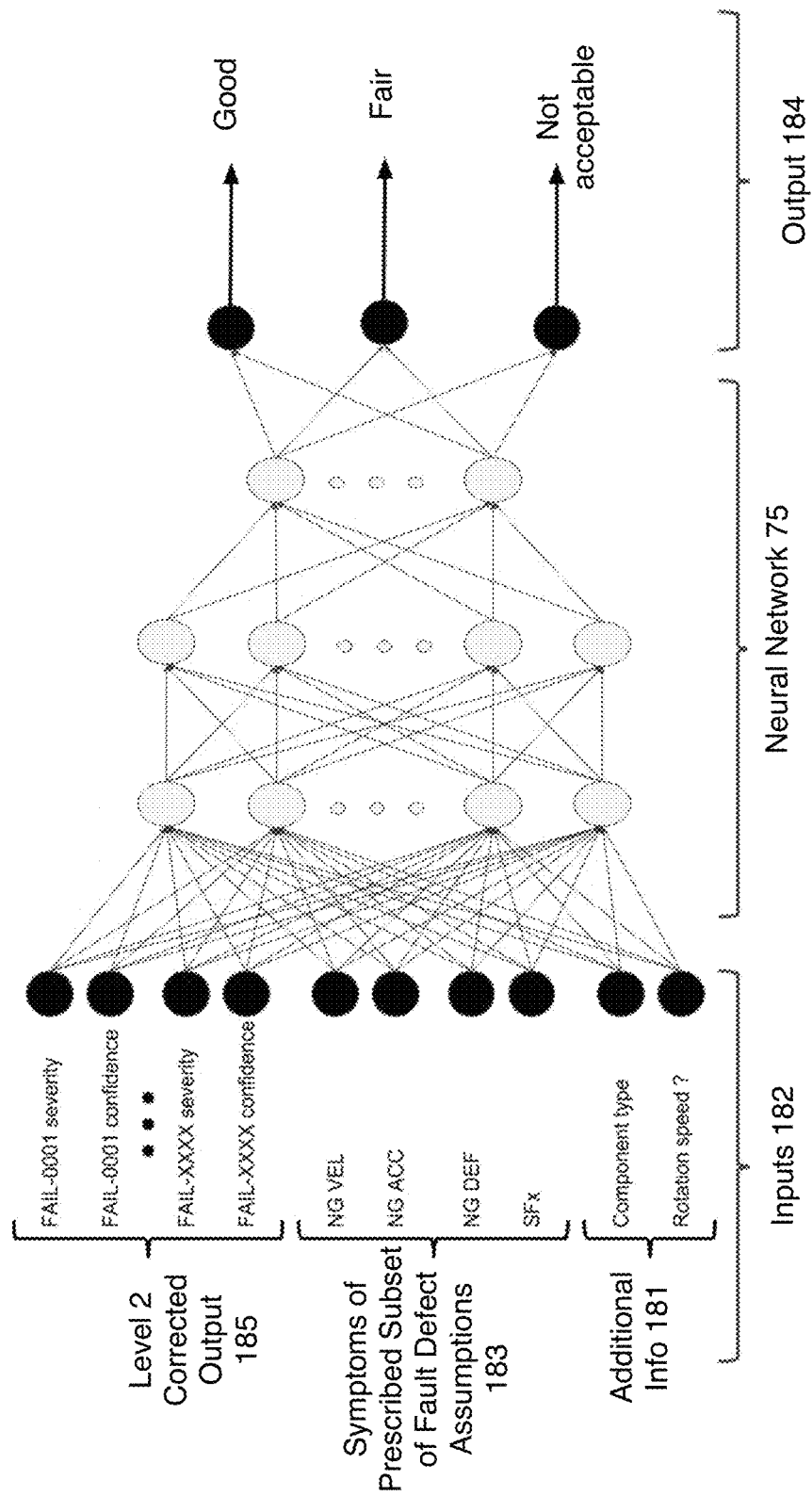
FIG. 6 is a schematic diagram of a portion of a classification-based neural network for deriving an overall health rating of a machine, in accordance with an embodiment of the invention.

The automated diagnosis module 70 also determines an overall health rating 71 of the machine 12a or of a primary component of the machine 12a. A characteristic model embodied as neural network 75 (see FIGS. 3 and 6) is devised to implement the determination of the overall health rating 71 In a preferred embodiment, a subset of the fault defect assumptions 82, including the associated Bayesian parameters, are used to build the classification-based neural network 75. FIG. 6 shows the classification-based neural network 75 according to an exemplary embodiment of the invention. The classification-based neural network 75 initially includes a select set of symptoms selected from among the symptoms for the fault defect assumptions being evaluated. Such set of symptoms is selected based on the topology of the machine 12a during execution of the setup process 102 for the machine 12. Such symptoms are prescribed as based on expertise in the industry and familiarity with machine topologies. In an exemplary embodiment, four symptoms are selected for the initial classification-based neural network. There are inputs 182 for the select set of symptoms 183. The classification-based neural network 75 also has inputs for additional prescribed information, including the rotation speed and component and the type of a primary component, (e.g., a motor) for which the overall health rating of the machine or the machine's primary component is applied. Parameters of the classification-based neural network include symptom weights. The initial settings of the weights are prescribed in accordance with the machine topology. The outputs 184 of the classification-based neural network are probabilities (e.g., between 0 and 1; between 0 and 100%) of overall health of the machine (or primary component, as per the embodiment.) According to a preferred embodiment, the range of overall health ratings include a prescribed set of standard ratings, (e.g., good, fair, not acceptable.) Accordingly, based on the inputs to the classification-based neural network and the parameter settings for the classification-based neural network, outputs are derived in the form of a probability that the overall health is good, a probability that the overall health is fair, and a probability that the overall health is not acceptable. The rating with highest probability is the overall health rating 71 as determined by the automated diagnosis process 70 implementing the classification-based neural network 75. The classification-based neural network parameters are stored in the machine diagnostic databases 36. In particular the classification-based neural network 75 for a specific machine 12a is stored in the machine 12a classification-based neural network database 127. (See FIG. 7.)

Off-Site Portion of Machine Diagnostic Data Acquisition Network Environment

Figure 7:
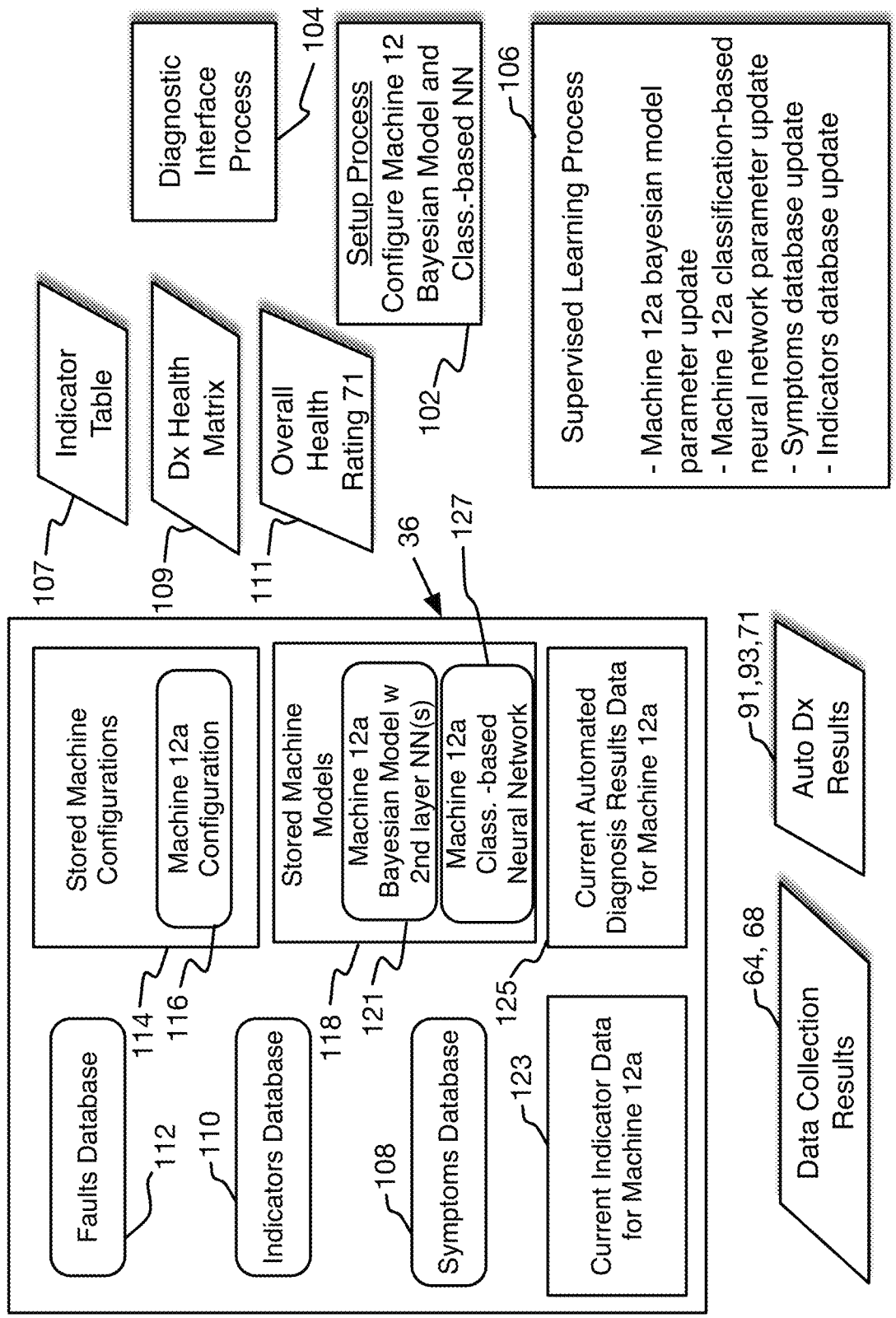
FIG. 7 is a diagram of the off-site portion of the machine diagnostic data acquisition network environment of FIG. 1, according to an embodiment of this invention.

FIG. 7 shows the off-site portion 30 of the machine diagnostic data acquisition network environment of FIG. 1. The off-site portion 30 includes the machine diagnostic database 36 and the processes or applications 102, 104, 106 executed on any of the machine maintenance system 35, the computing device 33, the device 20, or on-site processing system 29 of FIG. 1. The machine diagnostic databases 36 include a global database 112 of faults, a global database 110 of indicator definitions, and a global database 108 of symptoms, symptom apriori, and symptom weights. Entries from the databases 108, 110, 112 are extracted or otherwise form a database 121 for a specific machine according to the topology of the specific machine so as to define the Bayesian probability model 74, including the first layer Bayesian probability sub-networks and the second layer family neural sub-networks for the Bayesian probability model, and the classification-based neural network 75 of the specific machine. Accordingly, there is a database 114 of machine configurations, including a subset database 116 for the machine 12a. There also is a database 118 of diagnostic models, including a subset database 121 for the Bayesian probability model with the first layer Bayesian probability sub-networks and the second layer family neural sub-networks; and a subset database 127 for the classification-based neural network 75 of machine 12a. In addition the indicator results and the automatic diagnoses results 91 (including the overall health rating 71 of the machine) generated by each monitoring unit 18 of a given machine 12a are received and stored among the machine diagnostic databases 36 as a dataset 123 of current indicator data and a data set 125 of current automated diagnoses results. In some embodiments, the stored results 123 also include the collected raw data 64, 68 (see FIG. 3) collected by respective monitoring unit 18 of the machine 12a for the corresponding indicators for one or more time sample sets.

A first process (i.e., setup process 102) embodies the software executed to identify a machine's configuration and generate the machine's corresponding set of test point prescriptions 72, including defining a Bayesian probability model 74 (from database 121) for the machine. In particular, the topology of a given machine 12a is identified and the test point locations 19 are set. Such selections are processed to define the set of test point prescriptions 72 for the given machine 12a, the initial corresponding Bayesian probability model 74, including the first layer Bayesian probability sub-networks and the initial second layer family neural sub-networks of the Bayesian probability model, and the initial corresponding classification-based neural network 75. Another process (i.e., supervised learning process 106) embodies the software executed to implement supervised learning so as to update the machine's 12a Bayesian probability model 74 and classification-based neural network 75 to be more accurate and reliable. Process 106 also is configured to update the global symptoms database 108 and global indicators database 110 to apply the learning to other machines 12 at either one or both of the same or a different location. Another process (i.e., diagnostic interface application 104) embodies the software executed to permit access by an expert or other technician to the stored indicator data 123 and automated diagnoses results 125 of a given machine 12a. As discussed in more detail below, the user interface for the diagnostic interface application 104 includes an indicator matrix 107, a diagnostic health matrix 109, and a display 111 of the overall health rating 71.

In some embodiments the machine diagnostic databases 36 are accessible remotely. For example, the databases 36 and processes 102, 104, 106 may be stored in a cloud computing environment. The supervised learning process 106 periodically is executed automatically on its own, or is executed at the instigation of a change or command specified during execution of the diagnostic interface application 104. A technician logs into a secure account to run one of the processes 102, 104, which provide access to the automated diagnoses results from a machine 12. One of ordinary skill will appreciate that the databases 36 and processes 102, 104, 106 alternatively (or in addition) may be hosted on a private network or at a secure facility or in the on-site portion 10 of the network environment.

Diagnostic Interface Process 104

According to an aspect of the present invention, the diagnostic interface process 104 and supervised learning process 106 serve as tools and a methodology for automatic improvements to the automatic diagnostic artificial intelligence solution provided by automated diagnoses modules 66, 70. To achieve such improvements a method of integrating user feedback is implemented so as to embody supervised learning for the Bayesian probability model 74 content and one or more of the corresponding databases 121, 108, 110 from which the Bayesian probability model 74 is derived.

Conventionally, diagnostic results are communicated to customers as text reports. Technicians describe their conclusions upon reviewing the automated diagnoses results and recite recommendations and necessary actions. The information typically consists of a non-standardized textual narrative. This lack of standardization makes it difficult to manage the technician's feedback. According to an aspect of the invention, an indicator table 107, a diagnostic health matrix 109, and an overall health rating display 111 for the machine 12a are provided which presents the machine health and diagnostic results in a standardized, visually-aided format. A narrative report format of the health findings of the automated diagnoses 66, 70 also is provided. A user (i.e., a person or process) having the appropriate security permissions provides feedback in the form of updates/changes to the diagnostic health matrix 109, the narrative report, and the overall health rating display 111 of a machine 12. Changes are made by a technician or expert. In some embodiments a process run by the maintenance management system 35 has access to the results and updates/changes the diagnostic health matrix results, the narrative report, and the overall health rating 111 of a machine 12.

Once approved, the changes made by the user are used by the supervised learning process 106 to adapt the Bayesian probability model f121 or the machine 12a so as to improve the accuracy and reliability of future automated diagnoses 66, 70 of the machine 12a. The language used by the system to communicates results and recommendations is standardized; and the language used by the technician or another system to provide feedback upon reviewing results of the automated diagnoses modules 66, 70 correspondingly is standardized. Further, the presentation in the diagnostic health matrix 109 and the overall machine health rating display 111 are standardized. According to an aspect of the invention, a user having the appropriate security permissions can easily change the results and leave an audit trail of changes.

Figure 8:
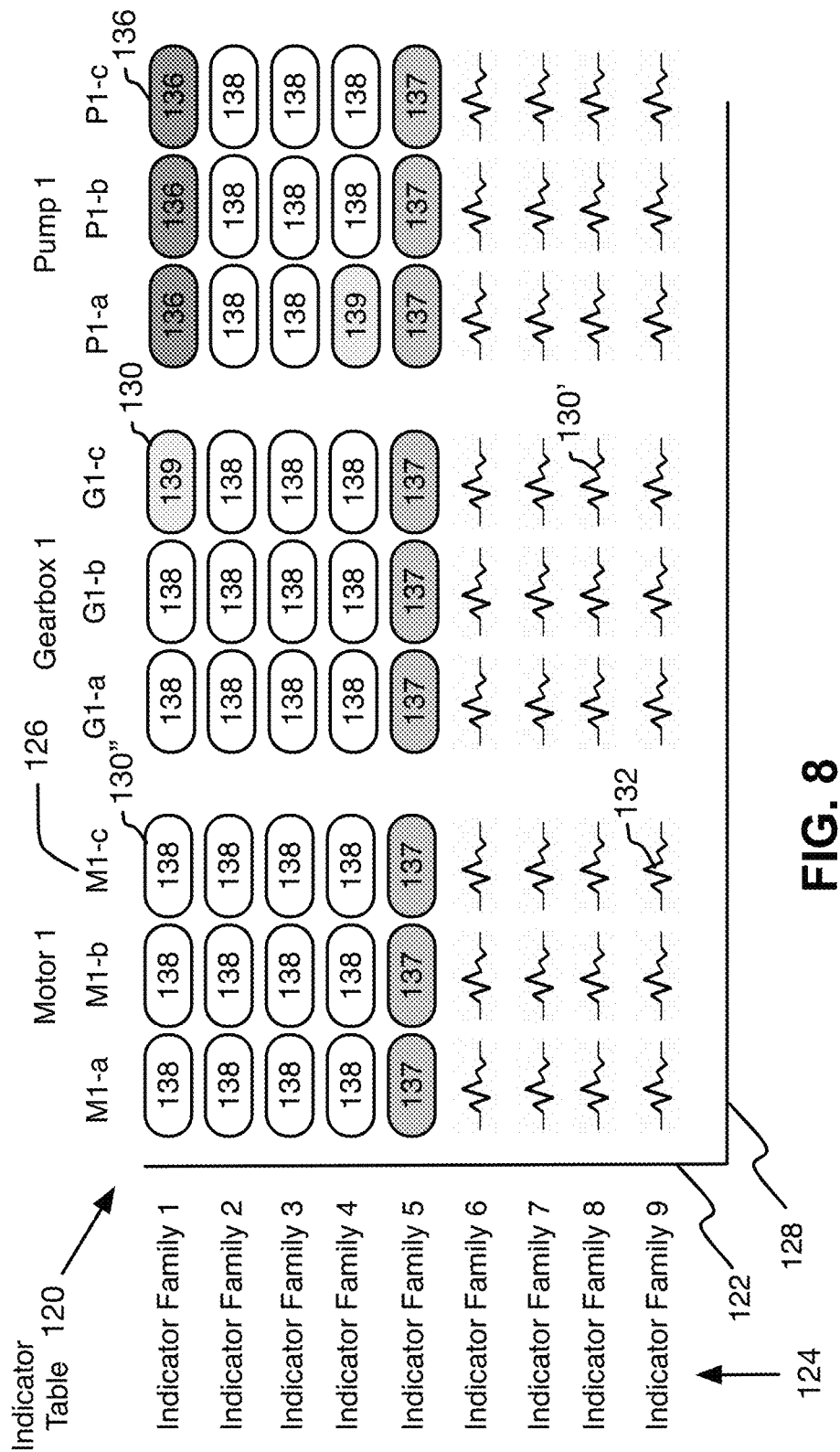
FIG. 8 is a diagram of an indicator table, according to an embodiment of the invention.

FIG. 8 shows an exemplary embodiment of an indicator table 120 displayed during execution of the diagnostic interface process 104. Along the y-axis 122 are listed the indicator families 124 for a corresponding machine topology for a given machine. The specific indicators 126 (e.g., M1-a, M1-b, M1-c, G1-a, G1-b, G1-c, P1-a, P1-b, P1-c) are listed along the x-axis 128 and grouped by the associated machine component (e.g., Motor 1, Gearbox 1, Pump 1.) For convenience the indicators 126 are labeled generically in FIG. 8. In specific embodiments, the specific indicator names preferably are displayed.

Each cell 130 of the table 120 corresponds to an indicator 86 and conveys information to the viewer about the indicator 86. As shown, Indicator families 6-9 correspond to a set of data (e.g., speed vs time) or a chart, (e.g. spectral analysis; a harmonic). A generic waveform label 132 is displayed for such cells 130'. By clicking on the waveform label 132, a corresponding chart pops up of the specific data allowing the technician to observe and diagnose the data of such indicator. Other cells 130", such as for indicator families 1-5 correspond to indicators 86 that are a value derived from collected raw data 64. Such cells 130" display the derived value (not shown so as to avoid cluttering the presentation in FIG. 8.) In preferred embodiments, such other cells 130" also are color coded so as to convey desirable information. In the illustration such cells 130" include a reference number corresponding to the color of the background of the cell 130". In an example embodiment, a red background 136 is used to indicate that the result is for an indicator 86 that corresponds to an alarm condition identified by the automated diagnoses 66, 70 for which urgent action is presently needed to correct a problem. A yellow background 137 is used to indicate that the result has been identified by the automated diagnoses 66, 70, as being an indicator 86 that is to be watched. In particular a defect is present and scheduling an action is recommended, but that no urgency is required. A green cell background 138 indicates that the result is within a normal range and does not correspond to an alarm condition. A light green cell background 139 is used to indicate that a slight defect is present, but that no immediate changes or actions are needed. One of ordinary skill will appreciate that other color-coding schemes and other coding schemes may be used to convey useful information at a glance to the technician viewing the matrix 120. Note that for purposes of using black and white figures, the reference numbers 136, 137, 138, and 139 are included to specify a corresponding color code rather than illustrate the figure with such color. Although not illustrated, it is preferred that the cells 130" display the indicator result in the foreground among the colored background.

Figure 9:
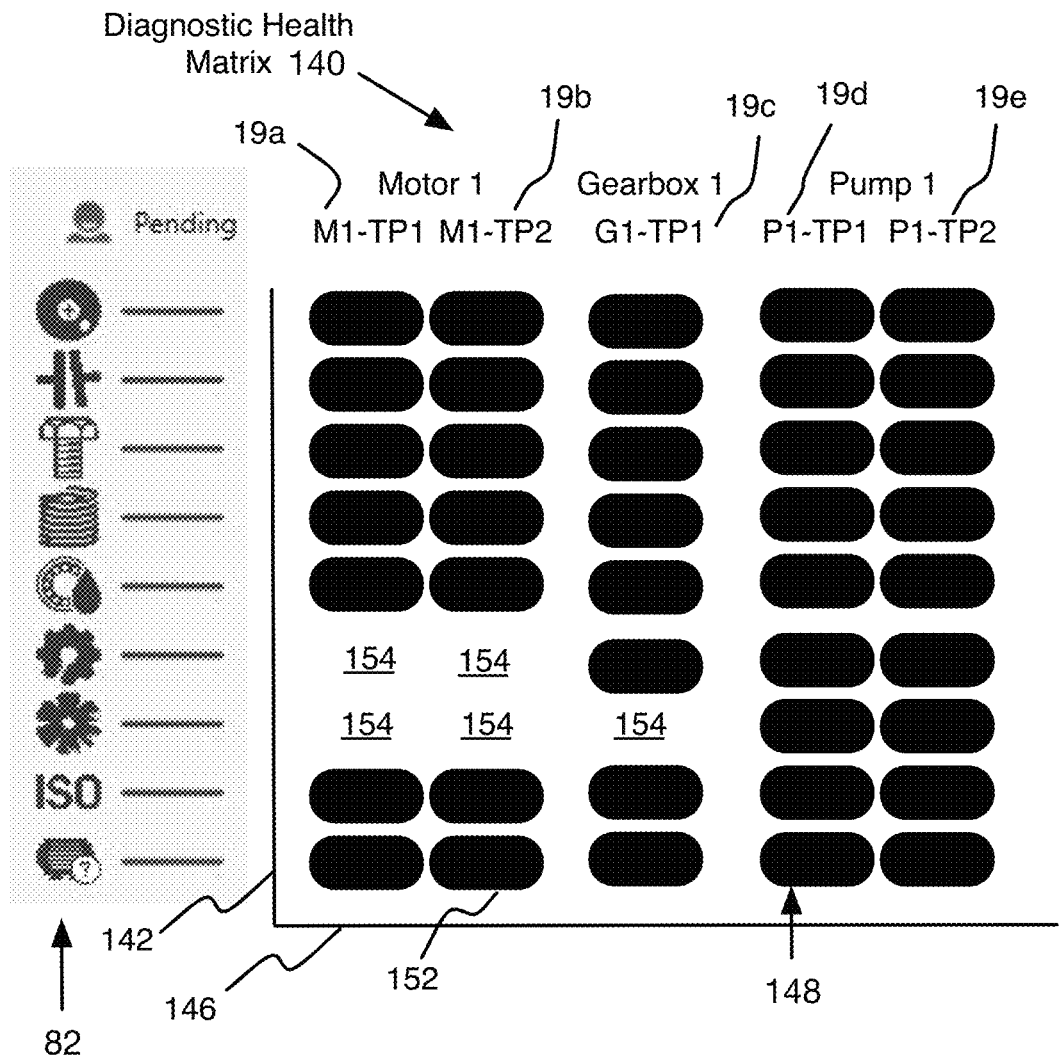
FIG. 9 is a diagram of a diagnostic health matrix for a given machine configuration prior to being loaded with results, according to an embodiment of the invention.

FIG. 9 shows an exemplary embodiment of a diagnostic health matrix 140 for a given configuration of a given machine 12a. Listed along the y-axis 142 are the fault defect assumptions 82 (e.g., unbalance, misalignment, shocks/modulation (i.e., looseness, electrical defect, gear geometric defect, gear localized defect, . . . ), structural resonance, bearing or lubrication problem, gear wear, pump cavitation, other ISO defect (e.g., soft foot, belt wear, nearby disturbance, vane pass, . . . ), suspicious machine (i.e., vibration behavior unhealthy but no fault identified by automated diagnoses)) for the machine 12a configuration. Accordingly, each row corresponds to a fault defect assumption 82. Listed along the x-axis 146 are the test points 19 for the machine 12a. Each cell 148 of the diagnostic health matrix 140 corresponds to a diagnostic determination (e.g., fault severity finding by fault diagnosis 89) for a fault defect assumption 82 at a specific test point 19. FIG. 9 depicts the matrix 140 in a state prior to being filled with the automated diagnoses results 91. In particular each cell 148 is color coded or otherwise indicated by a label 152 as not being set. Cells 154 for which there are to be no applicable results to be derived are empty.

Figure 10:
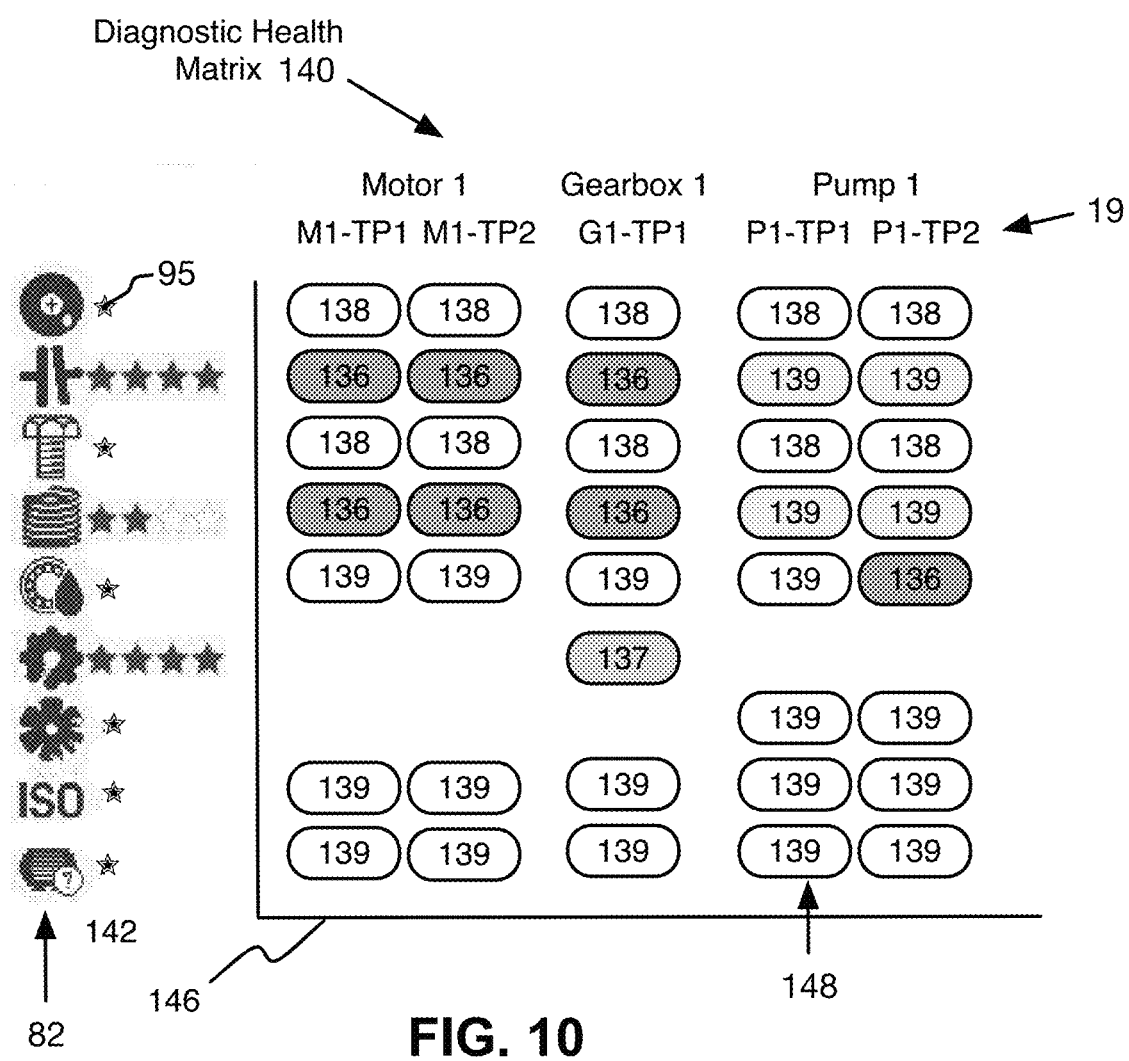
FIG. 10 is a diagram of a diagnostic health matrix for the machine configuration of FIG. 9 showing automated diagnoses results, including confidence rating, according to an embodiment of the invention.
Figure 11:
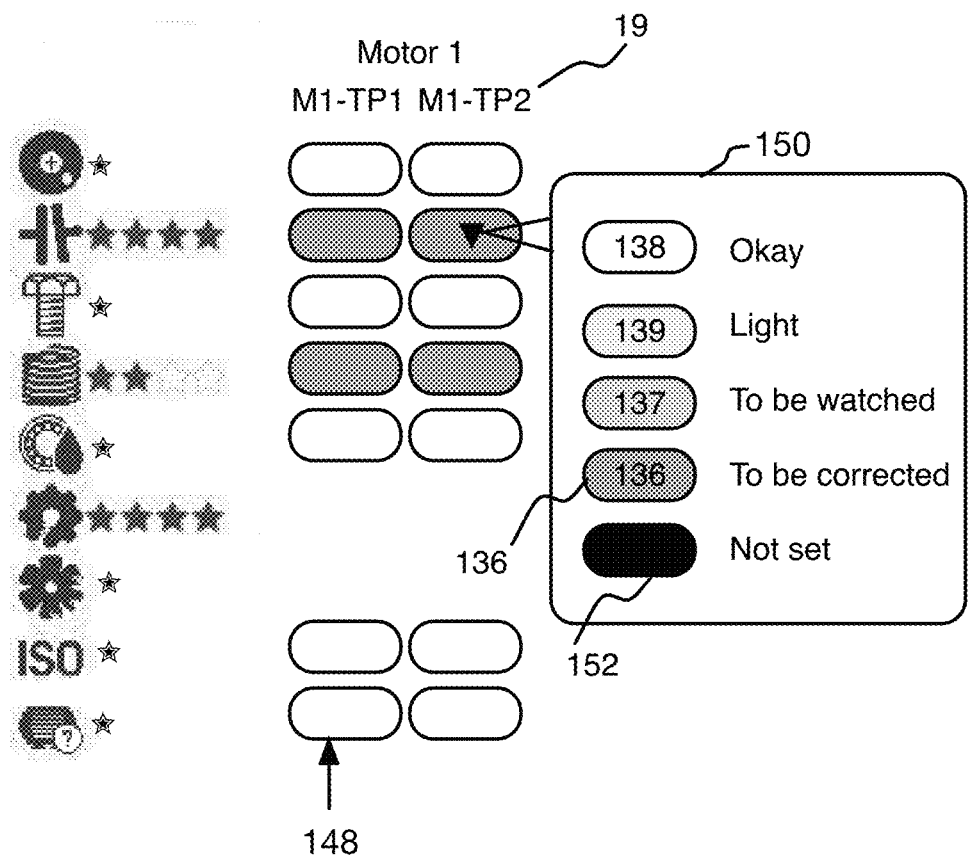
FIG. 11 is a diagram of a portion of the diagnostic health matrix of FIG. 10 showing a menu of settings available when clicking on a cell of the matrix, according to an embodiment of the invention.
Figure 12:
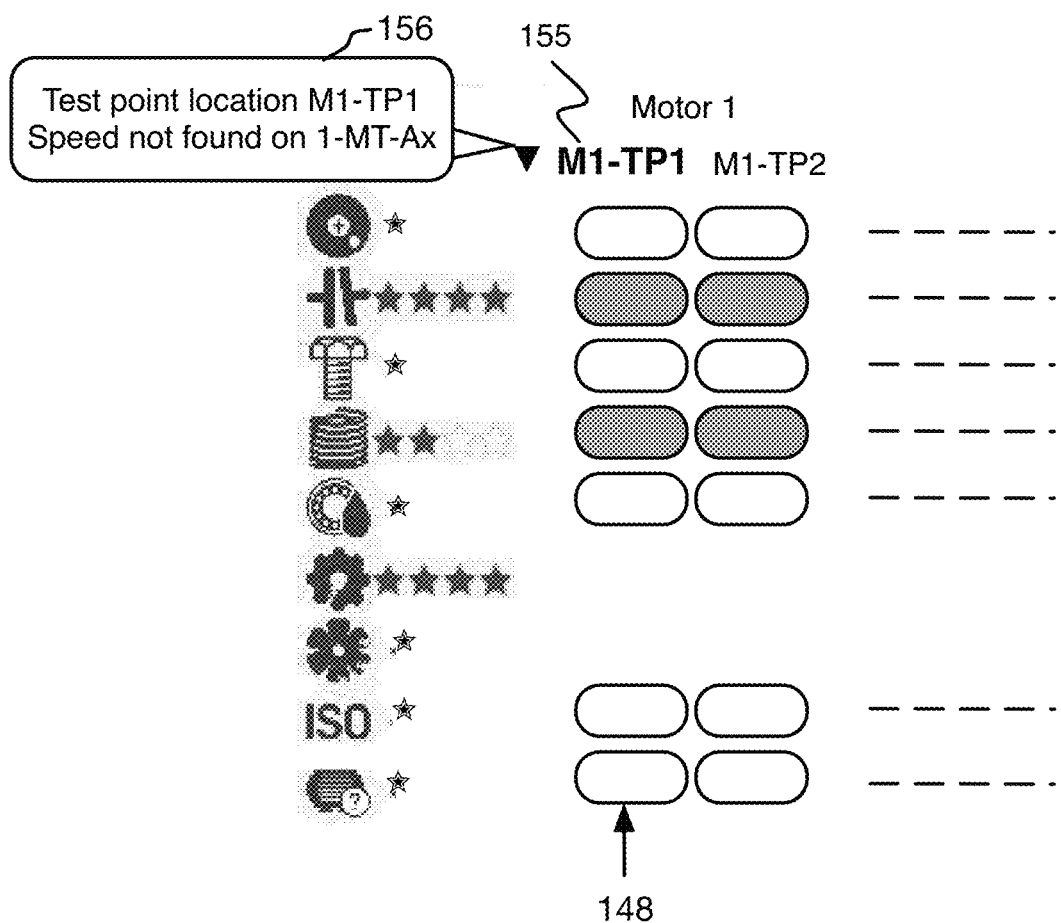
FIG. 12 is a diagram of a portion of the diagnostic health matrix of FIG. 10 showing a popup message displayed when clicking on a highlighted test point for a condition where incomplete data was received, according to an embodiment of the invention.

FIG. 10 shows an exemplary embodiment of the diagnostic health matrix 140 for the machine 12a as filled in with results as determined by the automated diagnoses modules 66, 70. In addition, the confidence level 95 for each condition (i.e., each fault defect assumption 82) where applicable, is depicted along the y-axis with the corresponding fault defect assumption 82 label. Each cell 148 of the matrix 140 conveys information to the viewer. In preferred embodiments, the cells for which results are to be derived are color coded so as to convey desirable information. FIG. 11 shows a key 150 for the color-coding according to the displayed embodiment. The key is shown in gray scale for purposes of illustration. One of ordinary skill will appreciate that alternative color schemes may be used. In an example embodiment, a red background 136 is used for a result of the automated diagnoses 66, 70 signifying a fault defect in need of correction. A yellow background 137 is used to indicate a result of the automated diagnoses 66, 70 signifying a fault defect assumption 82 that needs to be watched. A green background 138 is used to indicate a result of the automated diagnoses 66, 70 signifying good results within a desirable range. A light green background 139 is used to indicate that a slight defect is present but that no action is needed. For some cases, there may be no applicable determination of a fault defect assumption 82 at a given test point 19. In such case, the cell is left blank and empty. In some instances the automated diagnoses 66, 70 may be invalid, such as because data was unable to be sampled. FIG. 12 shows how the diagnostic health matrix 140 conveys this information. In an example embodiment, the diagnostic interface application 104 highlights the test point 155 from which the expected data should have been sampled and derived. When the user clicks on the highlighted test point 155, a message 156 is displayed. For example, in the illustrated embodiment the test point M1-TP1 at motor 1 of machine 12a is highlighted. The corresponding message 156 indicates that the speed measurement data was not found among collected data 64, 68, and accordingly the corresponding indicator(s) 86 and corresponding automated diagnoses results 91 were not derived.

FIG. 13 shows another exemplary embodiment of the diagnostic health matrix 140" for the machine 12a as filled in with results derived by the automated diagnoses modules 66, 70. In the illustrated example, the matrix 140" shows that an unbalance defect assumption 162 is to be watched, and that a bearing defect 164 at pump 1 is to be corrected. FIG. 14 shows a corresponding narrative report that is generated automatically in correspondence with the matrix 140", and which can be edited by the technician.

Figure 15:
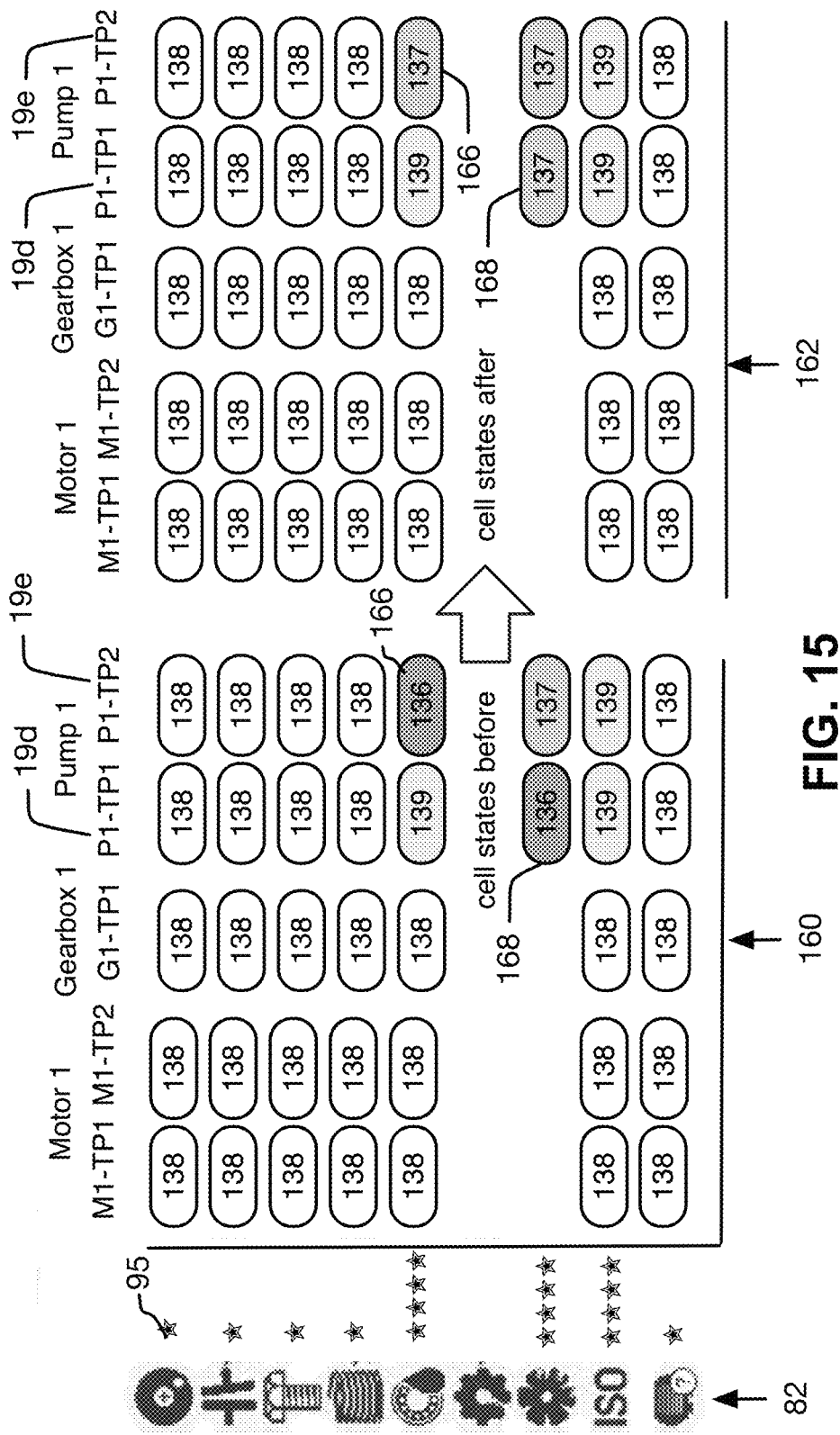
FIG. 15 is a diagram showing the cells of a diagnostic health matrix before and after a user has changed the content of a cell of the matrix, according to an embodiment of the invention.

FIG. 15 depicts a change process performed by a user. In an example embodiment, an expert executes the diagnostic interface process 104 on computing device 33. The computer device's display 41 displays the indicator table 120, the diagnostic health matrix 140, and the overall health rating 71 of the machine. The user analyzes the indicators in the indicator table 120 and reviews the results in the diagnostic health matrix 140 and the overall health rating 71 of the machine 12a. The user makes changes (e.g., as needed in the technician's expert opinion) to cell(s) of the corresponding diagnostic health matrix 140 and overall health rating 111 of the machine 12a. FIG. 15 shows the cells of a diagnostic health matrix in a before state 160 and an after state 162. The before state 160 corresponds to the state of the diagnostic health matrix at the start of the diagnostic interface application 104. In an example scenario, the before state 160 corresponds to the fault severity results derived automatically by the automated diagnoses modules 66, 70 and communicated to the database 125 of diagnostic databases 36 (see FIG. 7.) In the scenario illustrated, the user changed cell 166 of the before state 160 from a failure state (i.e., red color code 136) to a warning state (i.e., yellow color code 137), as depicted at the same cell 166' in the after state 162 of FIG. 15. Specifically, the user changed the bearing defect analysis at test point 19e of pump1 (P1-TP2) from a failure condition to a warning condition. In addition, the user has changed cell 168 of the before state 160 from a failure condition (i.e., red color code 136) to a warning condition (i.e., yellow color code 137), as depicted at the same cell 168' in the after state 162 of FIG. 15. Specifically, the user changed the gear defect analysis at test point 19d of pump1 (P1-TP1) from a failure condition to a warning condition. To enact the change in an example embodiment, the technician clicks on the cell 166/168. A popup menu then is displayed showing the range of settings for the results of such cell 166/168. The popup menu 150 is depicted in FIG. 11 and described above with regard to FIG. 11. The user clicks on or otherwise selects a rating to change the rating for such cell. Once such change is saved, an associated narrative in the corresponding narrative report screen (of the format shown in FIG. 14) is automatically changed to conform to the changed setting selected by the user. In addition, the technician may further edit and alter the narrative report directly in the narrative report screen. After making one or more changes, the expert's changes/edits are saved. Thereafter, a user can view the diagnostic health matrix 140 of the automated results derived by the automated diagnoses 66, 70 in one tab (or window or other display construct), and view the changed diagnostic health matrix (i.e., after state 162) in another tab (or window or other display construct).

The user also may edit the overall health rating 111 displayed by the diagnostic interface process 104. In a specific embodiment, the user selects the displayed rating 111. A popup menu then is displayed showing the range of ratings available. In a specific embodiment, the overall health rating 111 of a machine 12 is selected from the range of ratings including: good, fair, not acceptable.

Supervised Learning—Overview

According to a preferred embodiment, a cloud computing environment is used to facilitate the supervised learning processes and improve the sensitivity and specificity of a fault defect assumption analyses. Sensitivity and specificity are respectively the capacity to detect a failure when it exists and the capacity to avoid false discoveries of failures. The diagnoses provide two levels of information. At one level, global advice on the overall machine health is provided, which corresponds to the ISO10816-3 definition (e.g., —green: no action required—good; yellow: an action can be conceived during a scheduled shutdown—fair; and red: action needed ASAP.—not acceptable) At another level detailed diagnostic results are provided for a specific condition at a specific test point (e.g., fault severity assessment and confidence level.)

Figure 16:
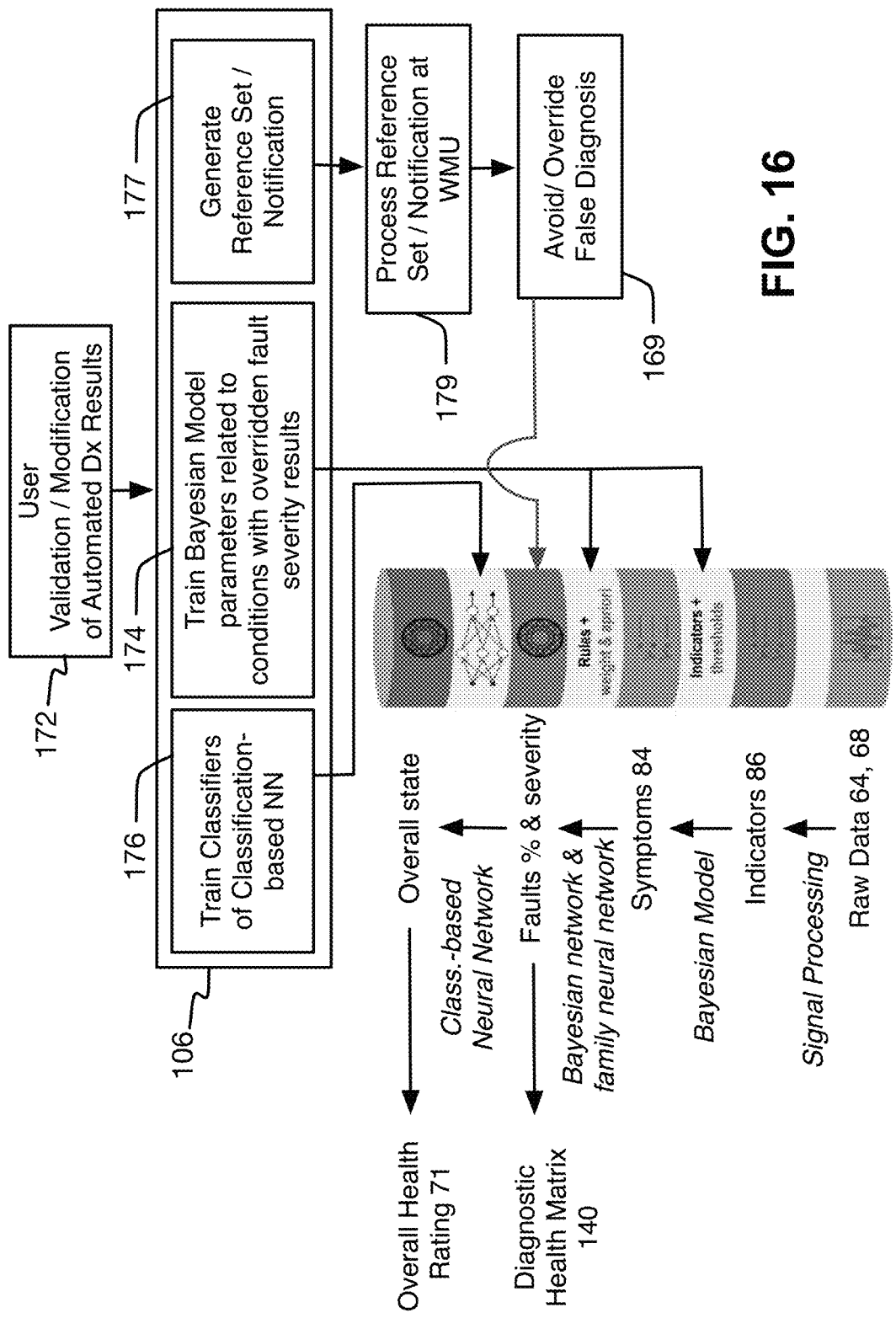
FIG. 16 is a diagram showing a methodology for supervised learning of the artificial intelligence embodied by the data collection and automated diagnoses processes of this invention, in accordance with an embodiment of this invention.

FIG. 16 shows an overview of the supervised learning methodology implemented in accordance with an embodiment of this invention. The methods follow after step 172, i.e., after the automated diagnoses results are reviewed and modified by a user during execution of the diagnostic interface process 104. Those changes are stored and validated. Thereafter, the supervised learning methods are performed. The supervised learning methodology corresponds to three kinds of "Artificial Intelligence" approaches. The first method corresponds to the case of machine learning where an optimization problem is solved to improve the reliability of the detailed automated diagnosis over the long term. On multiple occasions, more data is added to the cloud dataset. As implemented, more efficient scalar values are identified in the parameterized first layer Bayesian probability sub-networks and second layer family neural sub-networks. In particular the symptom weights and indicator thresholds of the Bayesian probability model 74 (i.e., first layer Bayesian probability sub-networks and second layer family neural sub-networks) are trained at process 174. The changes do not change the specific symptoms or the list of symptoms defining the fault defect assumption. The supervised learning process, however, does modify the "settings" of the Bayesian model's sub-networks and second layer family neural sub-networks (e.g., symptom apriori, symptom weights, indicator thresholds), which are not easily defined by a human.

The second method is a method for improving the detection of overall machine health status over the long term. The overall health status of a rotating asset (level 1 diagnosis) is determined by using a Bayesian solution (e.g., classification-based neural network 75) applied to a subset of symptoms of the list of all symptoms for all fault defect assumptions of the machine. The classifiers used to determine the overall health rating 71 are trained at process 176. In a preferred embodiment of this invention, the initial symptoms 183 (see FIG. 6) and additional information 181 are prescribed according to the machine topology. The corrected test point automated diagnoses 185 (i.e., level 2 automated diagnoses at the test point level of analysis) (see FIG. 6) (i.e., the fault severities and the corresponding confidence levels) are added to the Bayesian solution. Accordingly, the classification-based neural network 75 includes input nodes for the initial symptoms 183, the additional information 181 and the corrected level 2 output 185 (i.e., fault severity and confidence level). The weights for the fault severity and confidence level nodes are trained using an iterative method. In particular the weights are varied until the classification-based neural network produces the same overall health rating as the updated overall health rating adjusted by the user.

The third method is a method for avoiding recurrent diagnostic errors in the near term. According to an embodiment of this invention, when the automatic diagnosis finds a fault defect but the fault then is invalidated shortly thereafter by an expert or a machine maintenance management system, it is preferable to avoid the same automated finding and subsequent correction over the near term future (i.e., when the diagnostic data for deriving the automated diagnoses is significantly the same.) According to a preferred embodiment, once the diagnostic health matrix is reviewed and either confirmed or changed, the indicator results in the indicator table are sent to the monitoring units to serve as a reference set of indicator results. Upon collection of a new set of raw data at the monitoring units 18, indicators are derived from the collected raw data. If the indicators have not significantly changed, then the prior diagnoses remain valid. Accordingly, automated diagnoses need not be performed for the new set of raw data and indicators. If the indicators have not significantly changed, then the reference set is considered to be out of date and the set is no longer used as reference set of indicators. Accordingly, automated diagnosis is performed for the new indicators and raw data. Automated diagnosis is performed for each new set of collected raw data and derived indicators while there is no valid reference set of indicators. In some embodiments, the new set of indicators derived by the monitoring units serves as the reference set until such set also becomes invalidated as being out of date.

According to an alternative embodiment of the invention, once the diagnostic health matrix is reviewed and either confirmed or changed, the third method instead includes sending a notification, generated at process 177, to the effected monitoring unit(s) 18. The automated diagnoses modules implemented at each monitoring unit 18 receiving a notification process the notification at step 179 and override the automated diagnoses results at step 169 when the indicator data is substantially unchanged.

Supervised Learning—Bayesian Model Parameter Training

Figure 17:
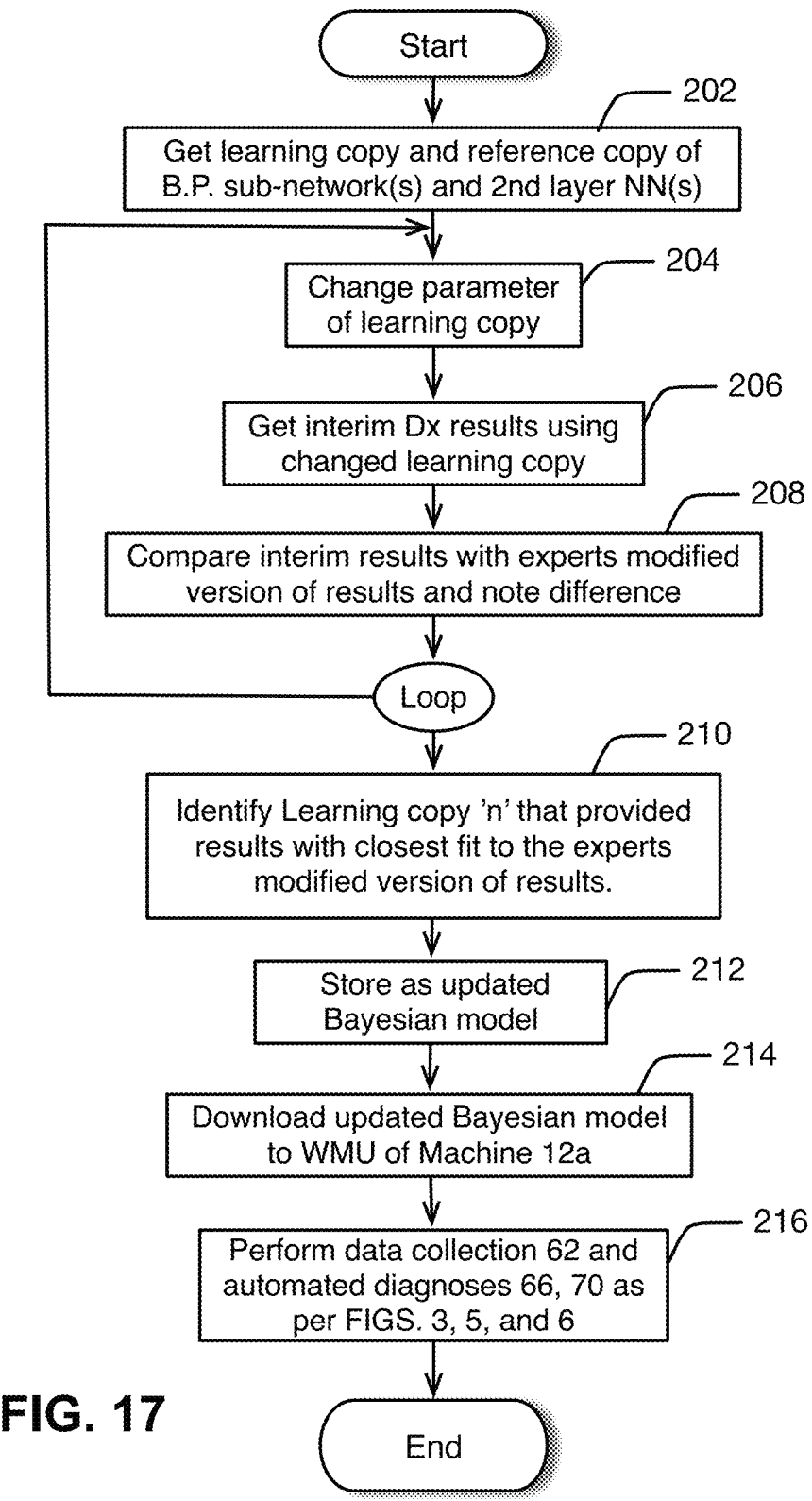
FIG. 17 is a flow chart of a method of supervised learning for updating the Bayesian probability model of a machine following a user override of the results reported in the diagnostic health matrix of the machine, in accordance with an embodiment of this invention.

FIG. 17 is a flow chart of the supervised learning method 200 for improving the automated diagnoses results for the fault defect assumptions of machine. In an example embodiment the machine maintenance system 35 executes a supervised learning process 106. In other embodiments, the process 106 is executed by the computing device 33, the local device 20 or the on-site processing system 29. Each of these devices includes a processor. The machine maintenance system 35 includes a processor 37, memory 47, and a communication interface. The machine maintenance system 35 has access to the machine diagnostic databases 36, including the machine configuration database 116 and the Bayesian probability model database 121.

At step 202, the processor 37 copies the Bayesian probability model 74 (i.e., first layer Bayesian probability sub-networks and second layer family neural sub-networks) stored in database 121 so as to have a reference copy and a learning copy of the Bayesian probability model 74 of machine 12a. At step 204, either one or both of at least one symptom and at least one indicator of the learning copy are selected. A corresponding parameter(s) (e.g., symptom apriori, symptom weight; indicator threshold) is changed. At step 206, the indicator data is processed using the changed learning copy of the Bayesian probability model to achieve interim diagnostic results. At step 208, the interim automated diagnostic results are compared to the automated diagnoses results of the health diagnostic matrix as updated with changes by the expert, (ie., the changed level 2 output). The difference between the expert's findings and the modified learning copy (version i, where i is the iteration number) is determined and stored. The steps 204, 206, and 208 are repeated in an exhaustive search of changes to the symptom weights and indicator thresholds. Upon completion at step 210 the learning copy iteration 'n' that provided (in per step 208) the closest results to the diagnostic health matrix (with the changed level 2 output) is used as the new/revised Bayesian probability model (i.e., revised zero or more first layer Bayesian probability networks; revised zero or more second layer family neural sub-networks) for machine 12a. At step 212 the machine 12a Bayesian model database 121 is updated to be the selected iteration 'n" version. At step 214, the Bayesian model is downloaded to the monitoring unit 18 of machine 12a. Each monitoring unit 18 stores all or at least a corresponding portion of the Bayesian probability model (e.g., Bayesian probability sub-network(s); second layer family neural sub-network(s)) for the conditions that are being monitored at the test point where such monitoring unit 18 is installed. At least one monitoring unit stores the entire updated Bayesian probability model for the machine 12a. Thereafter, at step 216 each monitoring unit 18 performs data collection 62 and test point level automated diagnoses 66. The test point level automated diagnoses 66 includes implementing the updated sub-network portion(s) of the Bayesian probability model. Also, at least monitoring unit 18a compiles indicator and/or raw data from the other monitoring unit 18b, 18c, 18d, 18e and performs machine level automated diagnoses 70 using the updated Bayesian probability model received at step 214. Such results are uploaded to the machine diagnostic databases 36 and the processes 104, 106 and the method 200 are repeated.

Supervised Learning—Overall Health Rating

The overall health rating 71 (see FIG. 3) of the machine 12a is determined by a monitoring unit 18a as part of the automated diagnoses module 70. Such rating 71 is included among the automated diagnoses results 91, 71 uploaded to the machine diagnostic database 36 and stored as part of the current automated diagnoses results data 125 for machine 12a. In a specific embodiment, the overall health rating 71 of a machine 12 is selected from the range of ratings including: good, fair, not acceptable. Other ratings names and additional ratings granulations may be used, (e.g., a scale of values between 1 and 5).

The overall health rating 71 is displayed a display field 111 by the diagnostic interface process 104 so as to be viewable by a user. Upon reviewing the indicator table 107 and the diagnostic health matrix 109, the user in some cases will disagree with the overall health rating 71 that was automatically generated by automated diagnoses module 70. Accordingly, the user will change the overall health rating display field 111. In an example embodiment, the user clicks on the field 111 and a popup menu appears listing the range of overall health ratings available for the machine 12a. The user selects a different rating than the current rating. The change is stored. Once such change is approved, the supervised learning process 106 then will perform a learning process to alter the criteria to be used by the automated diagnoses module 70 for generating the overall health rating of the machine 12a.

Figure 18:
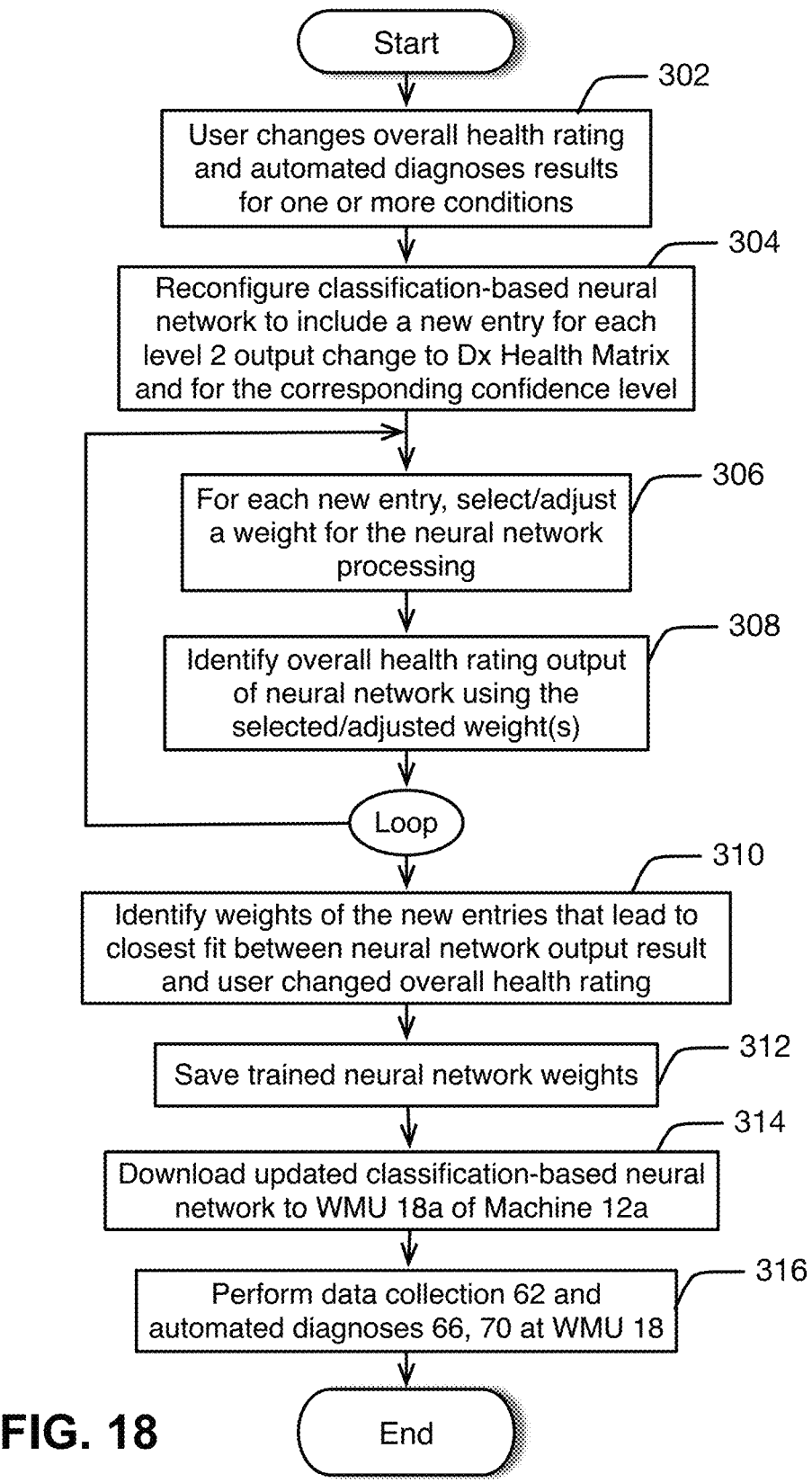
FIG. 18 is a flow chart of a method of supervised learning for updating the classification-based neural network used for deriving an overall health rating of a machine, in accordance with an embodiment of this invention.

FIG. 18 is a flow chart of the supervised learning method 300 for improving the automated diagnoses of the overall health rating 71 of the machine 12. At step 302, during execution of the diagnostic interface process 104 the user modifies the overall health rating field 111 of the machine 12a during the execution of diagnostic interface process 104. In addition, the user changes the rating for at least one cell in the diagnostic health matrix 109, (i.e., the user changes the level 2 automated diagnoses output.) Thereafter, the supervised learning process 106 is executed, such as by the machine maintenance system 35. The processor 37 at step 304 reconfigures the classification-based neural network 75 (see FIG. 6) to include additional entries for each approved level 2 output change, (i.e., for each cell of the diagnosis health matrix 109 changed by the user during execution of the diagnostic interface process 104 which is approved.) Accordingly, each such new entry corresponds to a fault severity of a condition at a test point. An additional entry is added for each respective confidence level 95 of each of the added fault severity nodes. At step 306 and 308 an iterative process is performed by the processor 37 to provide and train classification-based neural network weights for each of the new entries. At step 306 a set of weights first is selected for the initial iteration, and thereafter adjusted for later iterations. At step 308 the classification-based neural network is tested to determine the corresponding overall health rating of the machine for the interim tested version of the classification-based neural network 180. After an exhaustive search, at step 310 the weights are identified for the classification-based neural network version that achieved the closest results to the overall health rating result selected by the user during the execution of the diagnostic interface process 104. At step 312, the trained classification-based neural network is saved for the machine 12a in database 127 (see FIG. 7) as an updated classification-based neural network 75 for machine 12a. At step 314 the updated classification-based neural network 75 is downloaded at least to monitoring unit 18a. At step 316, monitoring unit 18a performs automated diagnoses 70 on collected data and generates automated diagnoses results 91, 71. In particular, automated diagnoses module 70 determines an overall health rating using the updated classification-based neural network. Such results are uploaded to the machine diagnostic databases 36 and the processes 104, 106 and the method 300 are repeated.

Short Term Avoidance of Inaccurate Diagnoses

Figure 19:
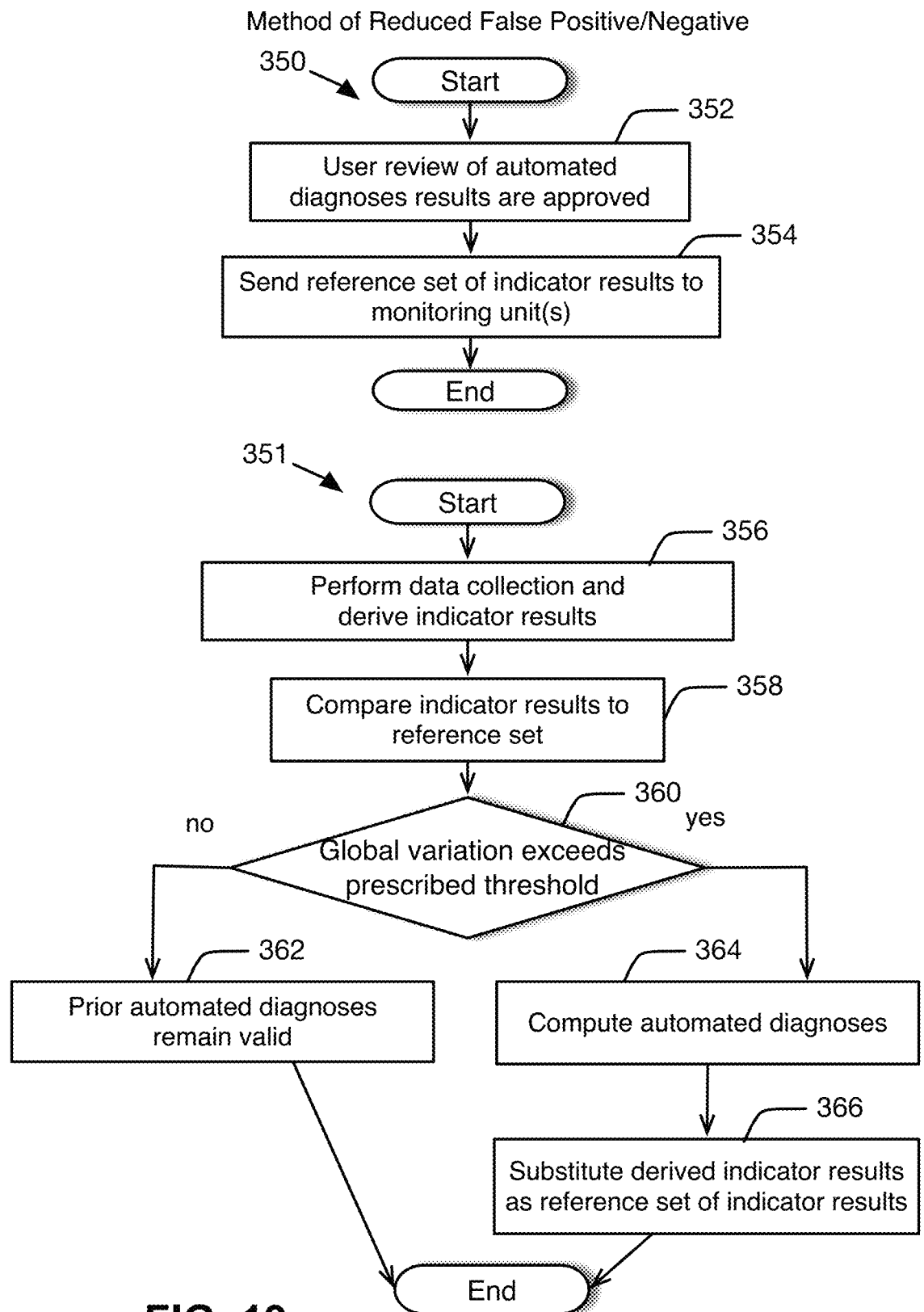
FIG. 19 is a flow chart of a method of avoiding the reporting of a repeated false result for a condition for which a user overrode the earlier reported automated diagnoses results, in accordance with an embodiment of this invention.

Another improvement to the automated diagnoses processes of a machine diagnostic maintenance system is presented in the flow charts 350, 351 of FIG. 19. In a preferred embodiment, automated diagnoses is avoided when conditions have not changed significantly. As described above, a user reviews the indicator results shown in the indicator table 120 and the condition severity results and confidence levels results shown in the diagnostic health matrix 140. The user either confirms or changes the results in the diagnostic health matrix 140 as described with respect to FIG. 15. The user's review is approved at step 352. Once the reviewed findings are approved, the indicator results 130, 132 in indicator table 120 are used as a reference set of indicator results to determine whether the machine's condition has significantly changed. At step 354, the indicator results 130, 132 are sent to the monitoring units 18 of machine 12. Periodically, aperiodically, or in response to a command, the monitoring unit 18 collects new raw data (e.g., data collection process 62 of FIG. 3), then derives indicator values from the raw data. Such data collection need not be triggered by receipt of the downloaded reference set of indicator results. At step 358, the processor 44 of the monitoring unit 18 compares the derived indicator values to the reference set of indicator results. At step 360, a determination is made as to whether significant changes have occurred. In a preferred embodiment a global variation between the currently derived indicator results and the reference set of indicator results is determined. Each indicator is compared to its corresponding indicator in the reference set. The difference contributes to the global variation. If the computed global variation is less than the prescribed threshold variation, then at step 362 the prior automated diagnoses results remain valid, (i.e., the results changed or confirmed by the user. Accordingly, new automated diagnoses results need not be derived at the monitoring unit 18. Over time for each collected set of raw data and the corresponding set of derived indicators, the automated diagnoses need not be computed while the reference set of indicators remains valid. However, if the determination at step 360 results in a finding that the global variation exceeds the prescribed threshold variation, then the reference set of indicators is considered to be out of date, i.e., invalid. Accordingly, at step 364 new automated diagnoses results are derived at the monitoring unit. The new automated diagnoses results and the corresponding new indicator results are uploaded to the machine diagnostic database 36. In due course another set of indicator results and automated diagnoses results are reviewed at step 352 and confirmed or changed, and result in a new reference set of indicator results that are sent to the monitoring unit at step 354. Over time for each collected set of raw data and the corresponding set of derived indicators, the automated diagnoses is computed when there is no valid reference set of indicators stored at the corresponding monitoring unit 18.

In some embodiments not every uploaded set of indicator results and automated diagnoses results are reviewed by a technician. For example, in some embodiments results are reviewed periodically or aperiodically, or in response to an automated alert or a manual command. Accordingly, there may be a significant time period where the reference set of indicator results has become out of date. Accordingly, in some embodiments when the reference set of indicator results is determined at step 360 to be out of date, at step 366 the new indicator results computed at the monitoring unit (that are used in the newly executed automated diagnoses) serve as a new reference set of indicator results against which future indicator values are compared. For example, prior to another execution step 352 and 354, steps 356-360 may be repeated one or more times in the normal course of monitoring unit 18 operations. At step 356 new raw data is collected and newly-computed indicator results are derived. At step 358, such newly-computed indicator results are compared to the new reference set of indicator results, which was defined at step 366. Then at step 360 the determination is made as to whether the newly-computed indicator results are significantly different than the reference set of indicator results. If the computed global variation is less than the prescribed threshold variation, then at step 362 the prior automated diagnoses results remain valid. However, if the determination at step 360 results in a finding that the global variation exceeds the prescribed threshold variation, then the reference set of indicators again is considered to be out of date. Accordingly, at step 364 new automated diagnoses results are derived at the monitoring unit. At step 366 the newly-computed indicator results serve as a new reference set of indicator results against which future indicator values are compared. At some time, a new reference set of indicator results is downloaded to the monitoring unit and becomes the current reference set for use in process 351.

In an alternative embodiment, the newly-derived set of indicators does not replace the reference set of indicators in response to the reference set being determined to be out of date or otherwise invalid. Instead, the system performs without a reference set of indicators, until such time that a new reference set of indicators is downloaded to the monitoring unit 18.

Short Term Correction of False Results

Figure 20:
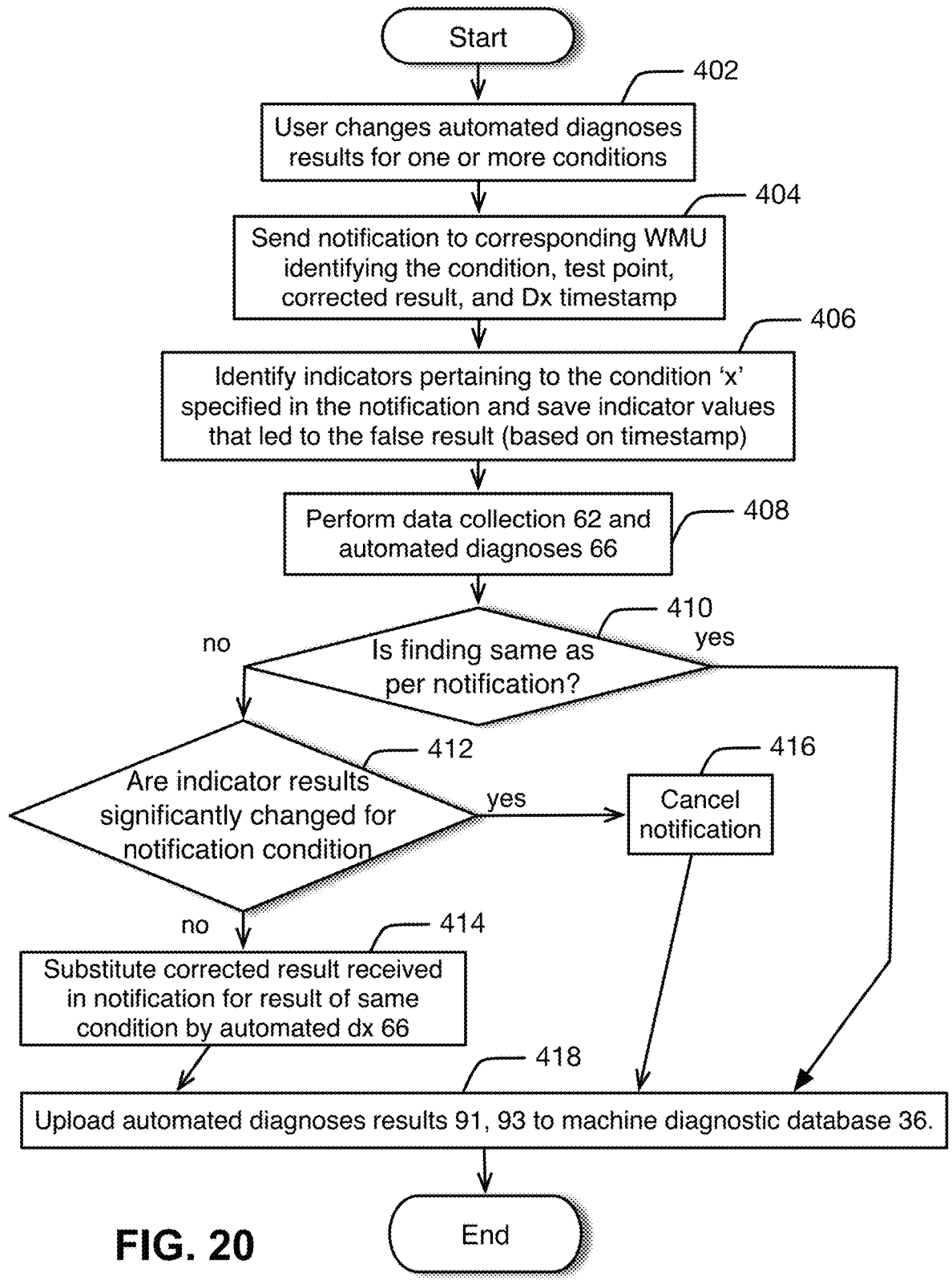
FIG. 20 is a flow chart of an alternative method of avoiding the reporting of a repeated false result for a condition for which a user overrode the earlier reported automated diagnoses results, in accordance with an embodiment of this invention.

FIG. 20 shows a flow chart for an alternative method to the method described with regard to FIG. 19. In some embodiments there is a significant time lag between when user changes are approved and when supervised learning method 200 is performed. Accordingly, once a user makes changes to the diagnostic health matrix 109, and such changes are approved, a notification is sent to the monitoring unit 18 to avoid a repeat of the false results for the applicable fault defect assumption. FIG. 20 is a flow chart of an embodiment of a method 400 for avoiding recurrent false results in the short term prior to updating of the Bayesian probability model 74 of machine 12a.

At step 402 the user's changes to the diagnostic health matrix 109 are approved. Accordingly, the results for one or more conditions at one or more test points are approved as per the updated values at the corresponding cell(s) of the diagnostic health matrix 109. At step 404 a notification is sent to each monitoring unit 18 affected by the updated results. Of significance is that the user made changes to a given set of automated diagnoses results. Such set of results are time-stamped or otherwise labeled so as to provide a way of distinguishing between sets of results derived for different sets of indicator data. For example, automated diagnoses is performed at the monitoring unit 18 periodically at some time interval (e.g., daily, weekly) or aperiodically (e.g., in response to a command, in response to detection of a need for a full automated diagnoses.) Accordingly, the notification sent to monitoring unit 18 includes the timestamp, along with the condition, test point, and corrected result. Of course in some embodiments the test point is inferred by sending the notification only to the monitoring unit 18 located at the test point 19 to which the notification applies.

At step 406 the receiving monitoring unit 18 processes the notification. The monitoring unit 18 has the indicator data stored for the previous automated diagnoses results. The processing of the notification includes identifying the set of indicator data and saving that indicator data so as not to be deleted while the notification remains in effect (e.g., do not delete before the notification is cancelled.) At step 408 the monitoring unit 18 performs data collection 62 and performs automated diagnoses 66 as described above with regard to FIGS. 3, 5, and 6.

At step 408 the automated diagnoses results computed by the automated diagnoses module 66 are compared to the corresponding results for the condition (and test point) identified in the received notification (of step 404). If the automated diagnosis result for such condition is the same as the corrected diagnosis identified in the notification, then the corresponding results as computed by module 66 are included among the findings 91, 71 uploaded to the machine diagnostic database 36. If the automated diagnosis result for such condition differs from the corrected diagnosis identified in the notification, then at step 412 the current indicator results derived from the collected raw data is compared to the saved indictor results determined for the notification, (i.e., the indicator results used for deriving results for condition x, where x is the condition identified in the notification.) A determination is made as to whether the current indicator results have significantly changed from the saved indicator results. If they have not significantly changed, then at step 414 the corrected result provided in the notification is substituted for the current automated diagnosis result for condition x. If the indicator results have significantly changed from the saved results, then the notification is out of data and the notification is cancelled at step 416. Because the notification is out of date, the current results derived by automated diagnoses 66 for condition x are used. At step 418, the automated diagnoses results are uploaded to the machine diagnostic database 36, including the current results derived by automated diagnoses 66 for condition x or the substituted findings for condition x as per the notification. Upon cancellation of the notification, the saved indicator data corresponding to the timestamp of the notification no longer needs to be save for the method 400. Accordingly, unless such data is being retained for other reasons, the indicator data may be deleted in the normal course of purging old indicator data. In some embodiments, the notification also may be cancelled in another contingency. Specifically, when the sub-network of the Bayesian probability model is updated to train the model based on the user's corresponding change to the automated findings, a message is sent to the applicable monitoring unit to cancel the corresponding notification.

OTHER REMARKS

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. The invention is intended to extend to all functionally equivalent structures, methods and uses, such as are within the scope of the appended claims. Those skilled in the art, having the benefit of the teachings of this specification, may affect numerous modifications thereto and changes may be made in form and details without departing from the scope and spirit of the invention.

What is claimed is:

1. A method with learning for generating an overall diagnostic health rating for a machine having moving parts, comprising the steps:

sensing machine diagnostic data, including vibration data, using one or more sensors installed at the machine;

deriving with one or more first processors a prescribed set of indicators from the machine diagnostic data;

for a first set of said machine diagnostic data, automatically diagnosing by a monitoring unit processor a first overall diagnostic health rating of the machine from the first set of said machine diagnostic data and a subset of the prescribed set of indicators, wherein said automatic diagnosing comprises said monitoring unit processor implementing a neural network classification model configured with a set of parameters defined for a prescribed set of symptoms for a prescribed set of diagnostic conditions monitored at the machine;

in response to a review of the prescribed set of indicators and the first set of said machine diagnostic data, storing in memory a corrected overall diagnostic health rating of the machine which differs from said first overall diagnostic health rating of the machine;

modifying with a third processor the neural network classification model so as to generate said corrected overall diagnostic health rating in response to said first set of machine diagnostic data, wherein said learning comprises said modifying step;

downloading the modified neural network classification model to a monitoring unit comprising said monitoring unit processor;

repeating said steps of sensing and deriving to derive a newly-derived set of indicators from newly-collected machine diagnostic data; and based on the newly-derived set of indicators, automatically diagnosing by said monitoring unit processor a second overall diagnostic health rating of the machine using the modified neural network classification model.

2. The method of claim 1, wherein the prescribed set of diagnostic conditions monitored at the machine is a first set of diagnostic conditions, and further comprising the steps:

monitoring a second prescribed set of diagnostic conditions of the machine encompassing more conditions than said first set of diagnostic conditions;

automatically diagnosing a fault severity probability for each one of said second prescribed set of diagnostic conditions; and storing in said memory a corrected fault severity probability for a first diagnostic condition among said second prescribed set of diagnostic conditions; and wherein said modifying with the third processor the neural network classification model comprises further configuring the modified neural network classification model with another parameter so as to be configured by a second set of parameters, said another parameter being defined for a first symptom for said first diagnostic condition.

3. The method of claim 2, wherein said modifying with the third processor the neural network classification model further comprises modifying a value of at least one parameter among said second set of parameters.

4. The method of claim 1, wherein said modifying with the third processor the neural network classification model comprises modifying a value of at least one parameter among said set of parameters.

* * * * *